United States Patent [19]

McDunn

[11] Patent Number: 5,404,288
[45] Date of Patent: Apr. 4, 1995

[54] TRANSFER LINE CONTROL SYSTEM UTILIZING DISTRIBUTED COMPUTING

[75] Inventor: Thomas P. McDunn, Rockford, Ill.

[73] Assignee: The Rexroth Corporation, Wood Dale, Ill.

[21] Appl. No.: 19,123

[22] Filed: Feb. 17, 1993

[51] Int. Cl.$^6$ .............. G05B 11/01; G05B 9/02; G06F 15/46
[52] U.S. Cl. ............... 364/140; 364/141; 364/146; 364/184; 364/185; 364/188; 364/468; 364/550
[58] Field of Search ............ 364/140, 141, 143, 146, 364/131, 184, 185, 188, 550, 578, 468, 551.01

[56] References Cited

U.S. PATENT DOCUMENTS

| | | | |
|---|---|---|---|
| 4,115,848 | 9/1978 | Kogure et al. | 364/185 |
| 4,216,528 | 8/1980 | Robertson | 364/468 |
| 4,283,773 | 8/1981 | Daughton et al. | 364/132 |
| 4,608,661 | 8/1986 | Sasaki | 364/140 |
| 4,689,736 | 8/1987 | Glaudel et al. | 364/140 |
| 4,858,102 | 8/1989 | Lovrenich | 364/136 |
| 5,128,857 | 7/1992 | Okada et al. | 364/140 |
| 5,251,122 | 10/1993 | Sakamoto et al. | 364/147 |

OTHER PUBLICATIONS

Septor Electronics Corporation, "Septor 2000 Zone Logic Demonstrator", pp. 14–24, Jun. 1990, El Paso, Texas 79922 U.S.A.
Septor Electronics Corporation, "System 90 Hybrid Network Control"Product Brochure, pp. 1–40 1988, El Paso, Texas 79922 U.S.A.
AEG–Septor, Industrial Systems Solutions–Septor 2000 Product and System Summary, pp. 1–24, 1989, El Paso, Texas 79922 U.S.A. and Federal Republic of Germany.
Telemecanique, "TSX 47/67/87 Modular Multifunction Programmable Controllers," Catalogue 01.90, pp. 2–23, and Sections 13 and 14, Jan. 1990, France.
Ford Motor Corporation, Ford Euro Eddi, Chapters 3, 4, and 5, believed to be published in Europe (Date unknown).

*Primary Examiner*—Paul Gordon
*Attorney, Agent, or Firm*—Fitch, Even, Tabin & Flannery

[57] ABSTRACT

Disclosed is a method and apparatus which provide control over industrial operations utilizing sequential processes. The invention focusses particularly upon machine transfer line operations in which milling, drilling, boring, and other machining processes are performed upon a work piece on a transfer line according to predetermined sequences of operations. The invention utilizes a sequential, integrated motion and process logic educator (SIMPLE) controller based on an IBM personal computer platform located at each workstation and at the transfer driver workstation. Intelligent monitoring of the operations of processes defined as a sequence of actuations is achieved with networked SIMPLE controllers wherein distributed computing is provided at the various workstations which comprise the transfer line. Distributed computing and a system of interlocks for use with a sequential program sufficiently narrows the scope of operations at each workstation to a manageable level. The interlocks ensure the safe and efficient operation of the any sequential industrial process, even when a workstation is randomly operated in a manual mode. Animation of workstation operations provides the user with an inherent user interface and also provides self documentation.

47 Claims, 37 Drawing Sheets

Fig. 6

| TYPE | SEQUENCE | | INTERLOCKS | | | | STAPLE | |
|---|---|---|---|---|---|---|---|---|
| | BLOCK NO. | BLOCK LABEL | START | DURING | END | EXPECTED TIME | ELAPSED TIME | PREV | NEXT |
| 1400 START SUB-SEQ | 1-999 USER DEFN | 40 CHARS USER DEFINEABLE | —┤├— GENERAL INPUT | COMPL. SUMMARY STATE / REL. | | | | |
| 1500 DISCRETE OUTPUT | 1-999 USER DEFN | 40 CHARS USER DEFINEABLE | —┤├┤├— BOOLEAN CONDITIONS (GENERAL I/O) | —┤├┤├— BOOLEAN CONDITIONS / GENERAL OUTPUT ON/OFF | —┤├┤├— BOOLEAN CONDITIONS / MONITOR END-STATE | XX.X USER DEFINEABLE | XX.X RAM VARIABLE | ← | → |
| 1600 MOTION | 1-999 USER DEFN | 40 CHARS USER DEFINEABLE | —┤├┤├— BOOLEAN CONDITIONS (GENERAL I/O) | —┤├┤├— BOOLEAN CONDITIONS / X Y F RS-274 MOTION DEF'N | —┤├┤├— BOOLEAN CONDITIONS / MONITOR END-POSITION | XX.X USER DEFINEABLE | XX.X RAM VARIABLE | ← | → |
| 1700 END SUB-SEQ | 1-999 USER DEFN | 40 CHARS USER DEFINEABLE | —┤├┤├— BOOLEAN CONDITIONS (GENERAL I/O) | SUMMARY STATE / ON & MNT | | | | |
| 1800 CONTINUOUS SOLVE | 1-999 USER DEFN | 40 CHARS USER DEFINEABLE | —┤├┤├— BOOLEAN CONDITIONS (GENERAL I/O) | —┤├┤├— GENERAL OUTPUT ON/OFF | | | | |

Fig. 14

| SEQUENCE STEP | INTERLOCK | | | | | |
|---|---|---|---|---|---|---|
| LABEL (USER-DEFINEABLE ASCII STRING) ACTUATION TYPE: | START CONDITIONS | DURING CONDITIONS | END CONDITIONS | EXPECTED TIME | ELAPSED TIME | STAPLE |
| >> START OF SUB-SEQUENCE | NETWORK INPUT | RELEASE OPPOSITE | NONE | N/A | N/A | ←→ N/A |

| SEQUENCE STEP | INTERLOCK | | | | | |
|---|---|---|---|---|---|---|
| LABEL (USER-DEFINEABLE ASCII STRING) ACTUATION TYPE: | START CONDITIONS | DURING CONDITIONS | END CONDITIONS | EXPECTED TIME | ELAPSED TIME | STAPLE ←→ |
| CONTINUOUS SOLVE | | ON/OFF | NONE | N/A | N/A | N/A |

| SEQUENCE STEP | INTERLOCK | | | | | |
|---|---|---|---|---|---|---|
| LABEL (USER-DEFINEABLE ASCII STRING) ACTUATION TYPE: | START CONDITIONS | DURING CONDITIONS | END CONDITIONS | EXPECTED TIME | ELAPSED TIME | STAPLE ← → |
| SUSPEND SEQUENCE WAIT FOR ACTIVATION | N/A | N/A | N/A | N/A | N/A | N/A |
| SUSPEND SEQUENCE WAIT FOR ACTIVATION | | | | | | |

| SEQUENCE STEP | INTERLOCK | | | | | |
|---|---|---|---|---|---|---|
| LABEL (USER-DEFINEABLE ASCII STRING) ACTUATION TYPE: | START CONDITIONS | DURING CONDITIONS | END CONDITIONS | EXPECTED TIME | ELAPSED TIME | STAPLE → ← |
| END OF SEQUENCE WAIT FOR ACTIVATION | N/A | N/A | N/A | N/A | N/A | N/A |
| END OF SEQUENCE WAIT FOR ACTIVATION | | | | | | |

| SEQUENCE STEP | INTERLOCK | | | | | |
|---|---|---|---|---|---|---|
| LABEL (USER-DEFINEABLE ASCII STRING) ACTUATION TYPE: | START CONDITIONS | DURING CONDITIONS | END CONDITIONS | EXPECTED TIME | ELAPSED TIME | STAPLE 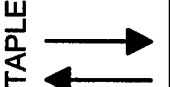 |
| END OF SEQUENCE AUTOMATIC RESTART | N/A | N/A | N/A | N/A | N/A | N/A |
| END OF SEQUENCE AUTOMATIC RESTART | | | | | | |

Fig. 22

| SEQUENCE STEP | INTERLOCK | | | | | |
|---|---|---|---|---|---|---|
| LABEL (USER-DEFINEABLE ASCII STRING) ACTUATION TYPE: | START CONDITIONS | DURING CONDITIONS | END CONDITIONS | EXPECTED TIME | ELAPSED TIME | STAPLE  |
| — | N/A | N/A | N/A | N/A | N/A | N/A |
| UNUSED | | | | | | |

| SEQUENCE STEP | INTERLOCK 604 | | | | | |
|---|---|---|---|---|---|---|
| LABEL (USER-DEFINEABLE ASCII STRING) ACTUATION TYPE: | START CONDITIONS | DURING CONDITIONS | END CONDITIONS | EXPECTED TIME | ELAPSED TIME | STAPLE ← → |
| START TIMER 1 | N/A | N/A | N/A | N/A | N/A | N/A |
| 2302 | START TIMER 1 | | | | | |

| SEQUENCE STEP | INTERLOCK 604 | | | | | |
|---|---|---|---|---|---|---|
| LABEL (USER-DEFINEABLE ASCII STRING) ACTUATION TYPE: | START CONDITIONS | DURING CONDITIONS | END CONDITIONS | EXPECTED TIME | ELAPSED TIME | STAPLE ← → |
| STOP TIMER 1 | N/A | N/A | N/A | N/A | N/A | N/A |
| 2402 | STOP TIMER 1 | | | | | |

| SEQUENCE STEP | INTERLOCK | | | | | |
|---|---|---|---|---|---|---|
| LABEL (USER-DEFINEABLE ASCII STRING) | START CONDITIONS | DURING CONDITIONS | END CONDITIONS | EXPECTED TIME | ELAPSED TIME | STAPLE |
| ACTUATION TYPE: | | | | | | |
| — START TIMER 2 | N/A | N/A | N/A | N/A | N/A | START TIMER 2 |

Fig. 26

| SEQUENCE STEP | INTERLOCK | | | | | |
|---|---|---|---|---|---|---|
| LABEL (USER-DEFINEABLE ASCII STRING) | START CONDITIONS | DURING CONDITIONS | END CONDITIONS | EXPECTED TIME | ELAPSED TIME | STAPLE |
| ACTUATION TYPE: | | | | | | |
| — STOP TIMER 2 | N/A | N/A | N/A | N/A | N/A | STOP TIMER 2 |

TRANSFER LINE CONTROL SYSTEM UTILIZING DISTRIBUTED COMPUTING

MICROFICHE APPENDIX

This application includes, pursuant to 37 C.F.R. §§ 1.77(c) (2), 1.96(b), a microfiche appendix consisting of 3 sheets of microfiche containing 210 frames of a program listing embodying the present invention.

FIELD OF THE INVENTION

The present invention relates to systems and methods for controlling machining transfer lines. In particular, the invention relates to systems and methods for controlling sequential processes utilizing distributed computing to control automated machine transfer lines.

BACKGROUND OF THE INVENTION

Since 1924 when the first transfer line automatically clamped and machined automotive engine blocks for Morris, automation has been the means for mass production. A transfer machine utilizes a transfer mechanism upon which work pieces are indexed in between workstations performing a prescribed sequence of operations using simple and fast motions. Each station processes the work piece with predetermined repetitive operations. A typical work piece, referred to as a "part" in the remaining discussion, might be an automotive engine component. The transfer machine is thus a collection of asynchronous machining stations synchronized by the flow of parts. Several such machines are linked together in a line to provide for the complete machining of a part. A "process" defines the collection of dedicated operations that occur at each station. The machining parameters and the sequential order of fixture actuations define the process.

The typical transfer machine operates as follows. A part is clamped in position at each station, and automated machine tools engage the parts at several stations. When the tools are withdrawn at the stations, the parts are unclamped and are transferred simultaneously to the next station by a single transfer mechanism. The operation of the transfer machine at each station includes the tasks of clamping the parts, machining the parts, and unclamping the parts.

Relay networks are prevalent in the industry for defining the clamping and motion sequences. Relays are now giving way to ladder logic implemented using programmable computers referred to as programmable logic controllers (PLC) which, in modern transfer lines, provides for central control of the transfer machine. The PLC helps to realize the goal of full automation by providing centralized computer control to the continuous, synchronous cycle that is performed by the transfer machine.

Several times during a typical day, the transfer line may be halted for various reasons. Given the current state of modern transfer lines implemented with centralized computing with a PLC and the resulting documentation problems, it is often difficult to discern precisely what caused the stoppage and secondly, it is often difficult for the operator to determine whether it is safe to restart machining operations or to manually carry out some steps.

Ladder logic, which is actually a carryover from the hardwired control relay blueprints, is the most popular method for programming PLCs. Ladder logic is easily taught and is familiar to most plant electricians. The biggest drawback, however, is that the programming of the PLC with ladder logic is carried out at a very low level. In fact, when a PLC is programmed with ladder logic, it operates much as if it were many single bit processors, operating in parallel.

The resulting ladder logic programs are far too detailed and complex and provide no layering or separation of tasks. A two-inch thick program printout for this type of machine is common, and yet the overall process is not really apparent in such a listing, which can take many days of effort to master. The process engineer has to rely upon an electrical engineer to translate the sequence steps of the process into machine and mechanism instructions. Once installed, typically only the specialist electrician is able to interpret the instructions. This makes process improvements difficult to implement. Any change made to the program requires a corresponding modification to the associated diagnostic program and message display program as well so the ladder logic can properly reflect fault detection in the modified process. Unfortunately, in practice, records of changes made to such ladder logic program are rarely kept. Thus, the documentation on file may not accurately reflect the actual program, and the two-inch thick listing at the console is frequently not current, and thus confusing to use.

There have been attempts to solve the twin problems of documentation and process restart. The current programming methods include, in addition to ladder logic, the use of function charts, state logic, and error dynamic diagnostic indication (EDDI). One approach for addressing the demands of machine transfer lines utilizes centralized control with a PLC augmented by state logic or zone logic as described in U.S. Pat. No. 4,858,102 to Lovrenich, entitled, "Distributed Logic Control System And Method". This approach addresses the problem of restarting the transfer line after shutdown such that costly errors are avoided in transferring the part onto the next station without the previous operation having been performed.

In addition, function chart programming languages, wherein inputs and outputs are assigned to an I/O space and wherein program blocks are executed in a predetermined sequence, provide a sequential for programming control systems like transfer line machine stations. The use of modular blocks interpreted in a process control environment is well known and described in U.S. Pat. No. 4,216,528 to Robertson, entitled "Digital Computer Implementation Of A Logic Director Or Sequencer".

By utilizing state logic, local at each machine station, improper states are thus avoided. While this approach provides inherent diagnostics and prevents improper random states through random operation, the process is still not apparent to the user, and motion is not integrated. The EDDI approach is an attempt to make the PLC operate as if it were a sequential process. This lets the process be more readily apparent to the user and provides inherent diagnostics. However, random operation is difficult to model. Thus, problems associated with restart remain inadequately addressed. EDDI also does not incorporate integrated motion.

Given the complexity of these systems and the several workstations, distributed computing, which provides intelligence local to the station, is costly to achieve with current methods. Thus, modern transfer machine have remained under the central control of a PLC.

Accordingly, primary objects of the present invention are to make the process more apparent to the user, provide inherent diagnostics and error messages, permit the user to engage in random manual operations or cycling of each station, and integrate tooling motions into the other transfer line processes.

SUMMARY OF THE INVENTION

The present invention takes a fresh approach to the transfer line problems by limiting the scope of tasks performed by a single controller and providing more specialized intelligence at each station. The controller integrating control and man-machine interface (MMI) at each local station eliminates the need for operators to rely on a distant, single control console to solve problems local to the station. Moreover, this helps to eliminate the extensive input and output wiring cost and complexity of prior art man-machine interfaces.

The present invention, briefly described, utilizes a sequential, integrated motion and process logic educator (SIMPLE) controller located at each workstation and at the transfer driver workstation. Each SIMPLE controller may be utilized to control all tasks performed at a machine station. In a typical configuration, several SIMPLE controllers (one each per station) are linked together on an inter-station network and communicate with a separate SIMPLE controller which functions as a synchronizer and operates the transfer driver and lift for the transfer machine. Centralized control is provided by this SIMPLE controller configured as a synchronizer which communicates with the workstation SIMPLE controllers via an interstation.

Each SIMPLE controller is fully capable of operating a machining station, and each controller includes a user interface that provides inherent diagnostics and error messages, thus eliminating documentation problems and making the process much more apparent to the user. Upon shutdown, the user is also able to use this same interface to perform random operations at any station. As its name suggests, SIMPLE controllers also provide for integrated motion control, as well as parts transfer and clamping.

The present invention achieves distributed computing and avoids chaotic results by designing each controller to function as a sequencer having an interlock mechanism to prevent erroneous operations. The SIMPLE controller's unique user interface portrays the machine actuations as they occur in a real-time animated fashion. The actuation interlocks are interpreted for proper actuation and capable of display at each station. The transfer line process is a series of machine motions termed actuations. The term actuation is used to relate these physical motions to the SIMPLE controller structure. Actuations are extended but not limited to include signal passing and memory setting operations as well. The present invention also establishes background monitoring of system variables and actuation end-states simultaneously with actuation interlock interpretation. Monitoring functions defined by each actuation remain active following interpretation of the actuation.

SIMPLE optimizes the control of sequence-oriented transfer line processes and random actuator steps for both setup and recovery. Inherently, SIMPLE provides effective process and diagnostic information to the machine operator to minimize down time. The man-machine interface, presented as a touch screen at each station, provides an educational view of normal machine operations. Changes can be readily programmed into each station by those having the proper authority.

The synchronizer provided by a SIMPLE controller operates the transfer machine and advises the various stations whether and when to clamp, unclamp, or cycle. The synchronizer is not concerned with the particulars of the cycling at the individual stations—such details are stored in the controller local to the stations. The SIMPLE controller operating as a synchronizer may, however, be utilized to upload and download programs to the individual stations.

Each SIMPLE controller may be operated either in automatic or manual mode. Thus, to restart the transfer machine, the operator may switch the SIMPLE controller to the manual mode, select an actuation using the touch screen, and press the activate button. The interlock interpretation advises the operator graphically of which signals prevent operation.

The transfer line control system utilizing distributed computing as implemented with the several SIMPLE controllers provides automatic diagnostics at each controller, automatic presentation of necessary interlocks, automatic device monitoring in a background mode, automatic timing and timeout limits flagging incompletion of actuations, and automatic status information.

The details of the invention, together with further objects and advantages of the invention, are set forth in the detailed description which follows. The precise scope of the invention is defined by the claims annexed to and forming a part of this specification.

BRIEF DESCRIPTION OF THE DRAWINGS

FIG. 6 is a data structure table illustrating the five types of actuations which may be utilized as actuations in the sequential program data structure presented to the SIMPLE controller (the five control actuation types are illustrated in more detail in FIGS. 14–18);

FIG. 14 is a table which illustrates the sequence and interlock details for the start of subsequence actuation illustrating the way in which the resulting data structure relates to program logic;

FIG. 18 is a table which illustrates the sequence and interlock details for the continuous solving actuation illustrating the way in which the resulting data structure relates to program logic;

FIG. 19 is a table showing the actuation for suspend sequence wait for activation;

FIG. 20 is a table showing the actuation for end of sequence wait for activation;

FIG. 21 is a table showing the actuation for end of sequence automatic restart;

FIG. 22 is a table showing an unused actuation;

FIG. 23 is a table showing the start timer 1 actuation;

FIG. 24 is a table showing the stop timer 1 actuation;

FIG. 25 is a table showing the start timer 2 actuation;

FIG. 26 is a table showing the stop timer 2 actuation;

FIG. 31 is the "current input states" display screen;

FIG. 32 is the "select input to edit" screen;

DETAILED DESCRIPTION OF THE PREFERRED EMBODIMENTS

Figure 1:
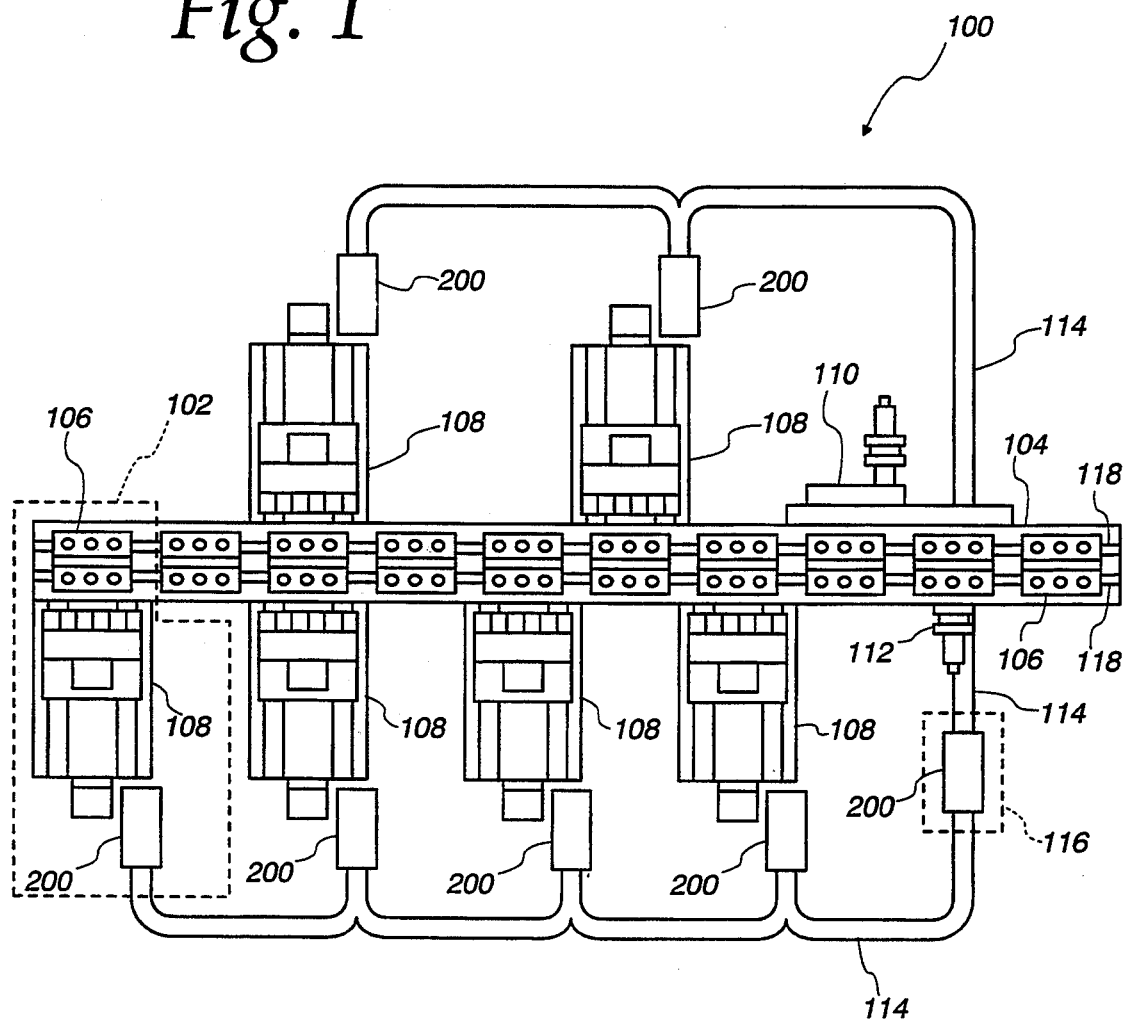
FIG. 1 is an overview plan diagram of a transfer machine control system 100 which embodies the present invention illustrating the way in which intelligent station controllers are networked to control the machining of parts on the transfer machine.
Figure 2:
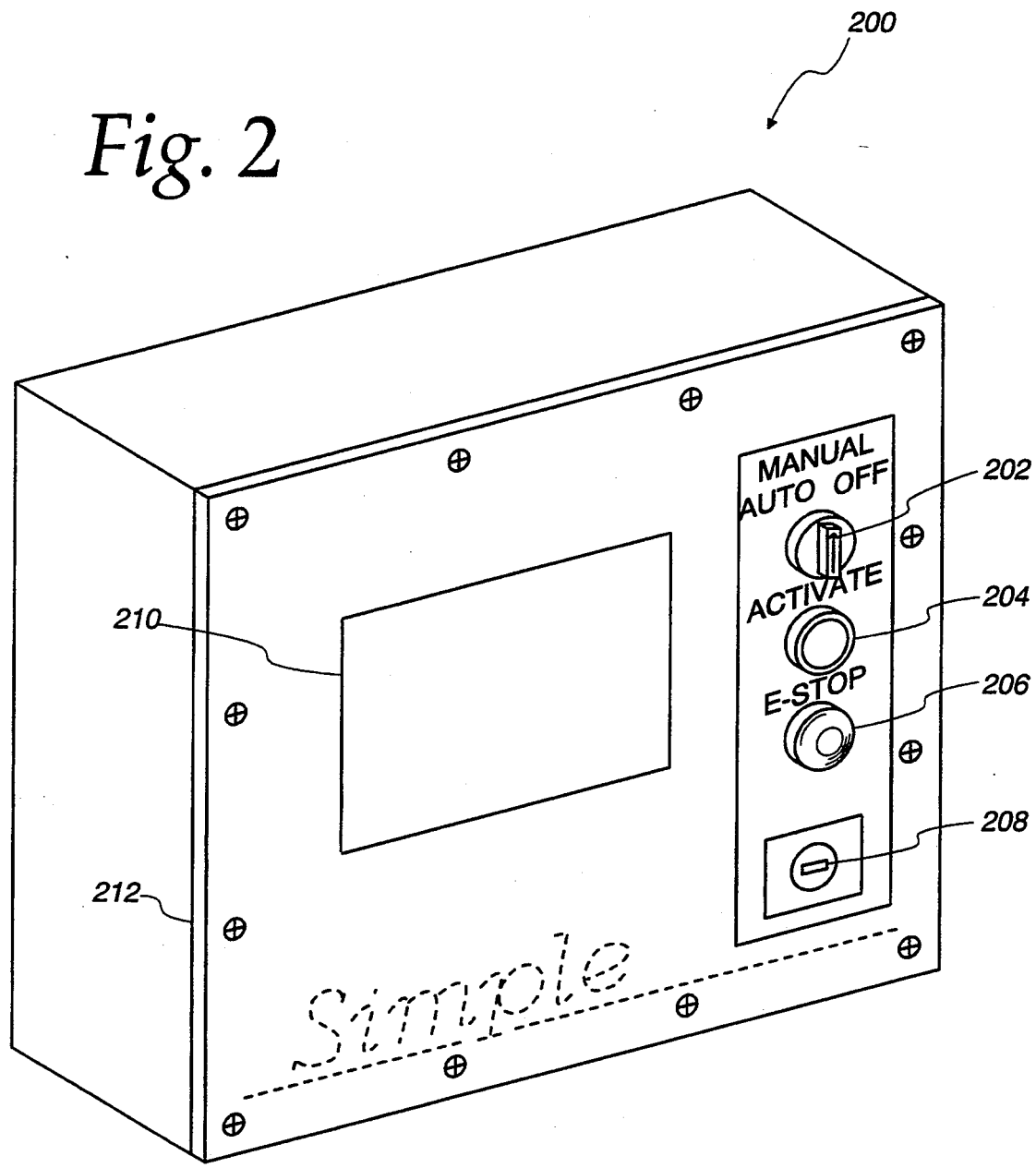
FIG. 2 is a perspective view of a SIMPLE controller.

A plan overview of a transfer machine utilizing the preferred embodiment of the invention is presented in FIG. 1 of the drawings. A transfer machine control system 100 generally comprises a system utilizing distributed computing. Seven SIMPLE controllers 200, also shown in FIG. 2, are distributed along the transfer line 104. One controller 200 is utilized with each machine tooling station 108. A typical machining workstation 108 and an engaged part 106 is denoted generally by station position 102. A synchronizer 116 is a SIMPLE controller 200 configured for operation with a transfer driver 110 and a transfer lift 112. The synchronizer 116 is equipped to communicate commands to the various other controllers 200 via the inter station network 114.

The synchronizer 116 instructs the transfer units 110 and 112 to index the parts, and then the individual controllers 200 focus upon the details of the task to be carried out at each workstation.

The synchronizer 116 facilitates the sequential generation of the seven major states of a traditional transfer line. These seven major states, combined with the transfer driver with several stations 102, define a machine that executes the following sequence of actuations:

1) unclamp fixtures
2) engage transfer
3) advance transfer
4) disengage transfer
5) clamp fixtures
6) cycle stations
7) return transfer Of the seven major states, four of the states include operations performed locally by the synchronizer, these being the transfer functions-engage transfer, advance transfer, disengage transfer, and return transfer. During the engage transfer state, the parts 106 are raised from the fixture on the rails 118. During the advance transfer state, the parts 106 move to the next machine tooling station 108. During the disengage transfer state, the parts are lowered onto the fixtures. During the return transfer state, the transfer bar operated by the transfer driver 110 is returned to its starting position.

In practice, there are two types of transfer operations, namely, the lift and carry and the skid transfer operation. FIG. 1, as illustrated, depicts a lift and carry operation wherein the transfer lift 112 lifts the parts and the transfer driver 110 moves them to the next machine tooling station 108. In other transfer lines, the parts skid along a transfer rail, driven by fingers that retract when the transfer mechanism is returning.

The cycling (machining process) through the machining actuations applied to the parts 106 by the machine tool 108, is actually an asynchronous task that is carried out within a state window coordinated as part of the overall sequential process. The synchronization of slow operations with faster operations introduces low machine utilization as the faster machine tool stations 108 wait for the unloading of their finished part 106. Ideally, slow operations should be matched within the same cycles as other slow operations and fast operations should be matched with other fast operations. Increases in utilization are gained in the present invention by reducing the degree of synchronization and designing more parallel tasks into the process. This extends the above seven major states into more overlapped and intertwined states, thus adding another dimension to the complexity of the control system. The distributed computing provided by the SIMPLE approach actually allows for a very complex transfer line system wherein the complexity of any given controller 200 is limited in scope and thus manageable even though the overall system complexity would be excessive if implemented on a conventional system utilizing ladder logic.

FIG. 2 illustrates the SIMPLE controller 200 which, in this preferred embodiment, is based upon an IBM PC AT compatible personal computer (PC-AT) having an Intel 80386 microprocessor. The controller 200 has an auto-manual-off select switch 202 which selects between automatic and manual modes of operation. An activate pushbutton 204 activates actuations selected via the touch screen when in the manual mode, interlocks permitting. An emergency stop switch 206 can halt the controller manually. A touch screen assembly 210 provides an easy, grime-impervious operator input and reduces the likelihood of malfunctions that are associated with conventional keyboards in the hostile machining environment. A password key interface 208 is utilized for security purposes to prevent unauthorized individuals from manually operating the machinery or altering the programming. A power light LED 212 indicates when the controller 200 is ON.

Figure 3:
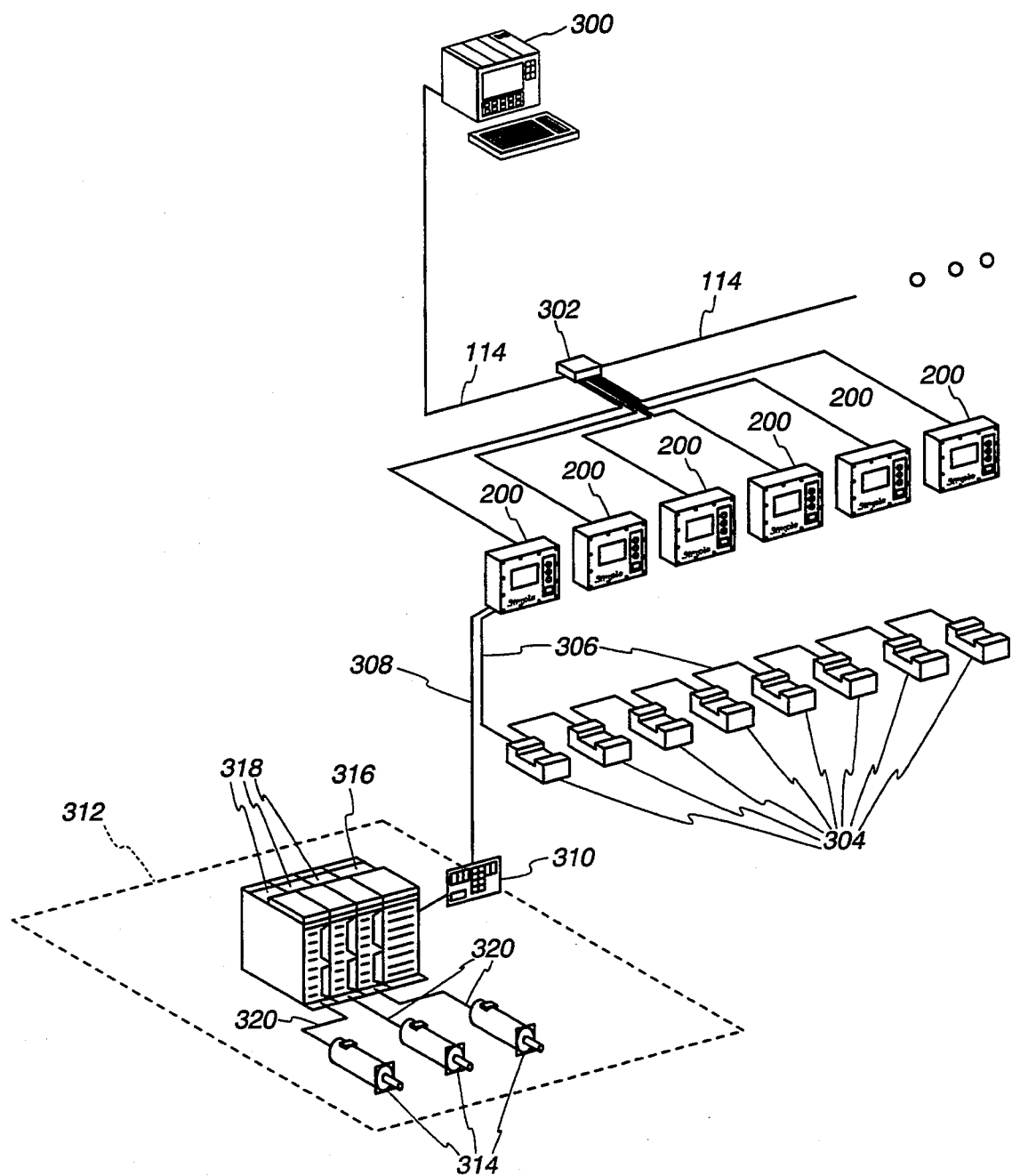
FIG. 3 is a partly perspective and partly logical view of networked SIMPLE controllers utilizing an inter-station network, an I/O network and a motion network.

FIG. 3 illustrates six networked controllers 200 interconnected via an inter-station network 114 through a network node 302. An optional operator's console 300 provides an additional user interface, but is not required to control the transfer line system. An I/O network 306 extending from each SIMPLE controller 200 provides communication with SERIPLEX I/O modules 304. The modules 304 provide an intelligent I/O interface for controlling devices and scanning sensors at each machine tool station 108.

The SERIPLEX I/O is available commercially from APC, Jackson, Miss. and is described in U.S. Pat. No. 4,808,994 to Riley, entitled, "Logic Interchange System", which is hereby incorporated by reference.

A motion network 308 operates with a parallel to serial conversion card 310 which provides commands phrased in the industry standard EIA RS-274 command language to a computerized motion controller (CMC) 316 of conventional design. The CMC 316, in turn, controls the digital drives 318 which in turn control servo motors 314 via motion control lines 320. The multi-axis motion assembly 312 illustrates that a SIMPLE controller 200 is equipped to provide multi-axis moves by coordinating the motion of plural individual servo motion motors 314 at each station. When such machining commands are carried out, appropriate command completion messages (or, alternatively, error messages) are conveyed back to the SIMPLE controller 200. Normally and conventionally, entire programs are stored within the CMC 316. In accordance with the present invention, such programs are now stored as multiple actuations in the SIMPLE controller 200 and are transferred, one command at a time, to the CMC 316 which no longer requires a display or program store.

Figure 4:
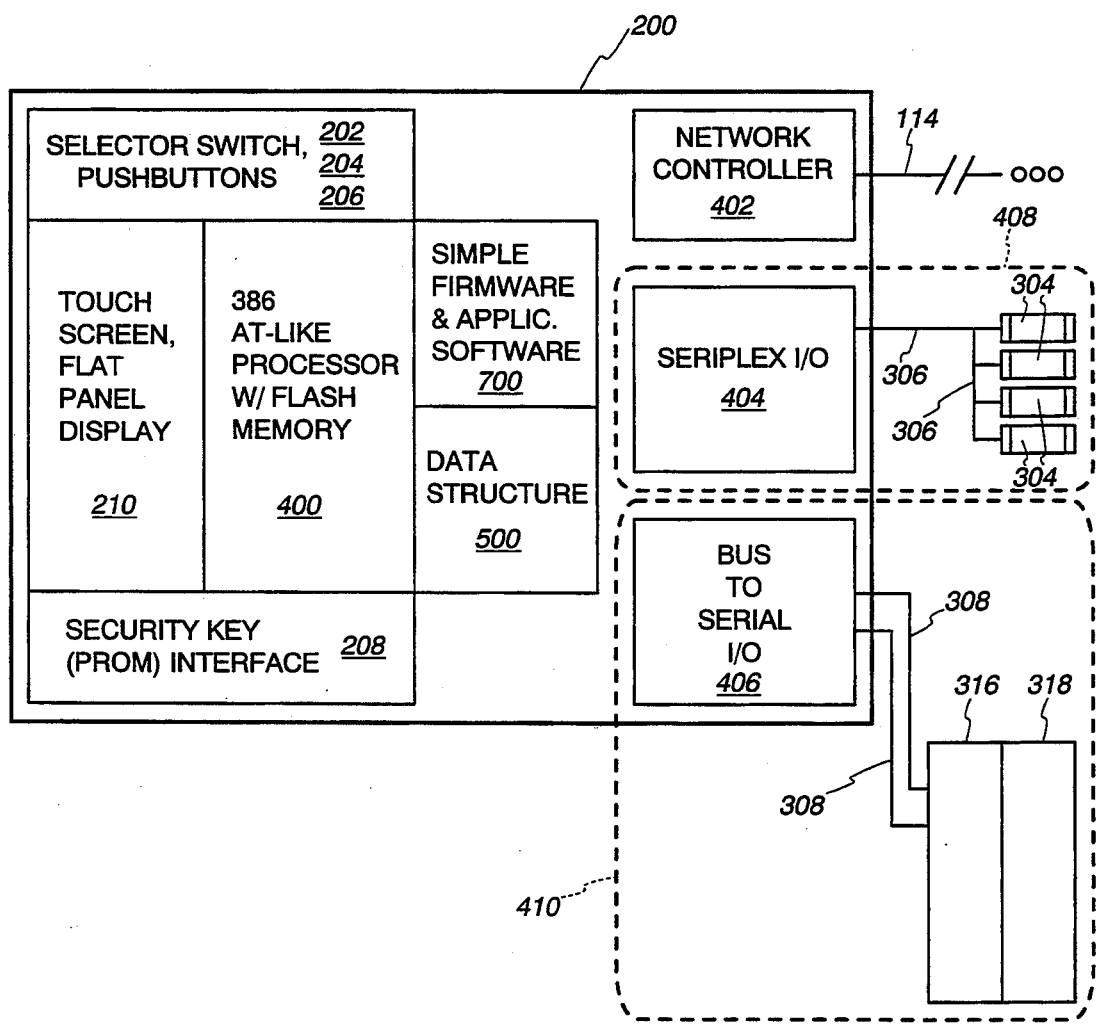
FIG. 4 is a block diagram showing the various components which comprise the SIMPLE controller and illustrating how the SIMPLE controller interfaces to the three networks.

FIG. 4 illustrates the inner workings and the various network interfaces associated with the SIMPLE controller 200. As depicted in block diagram form, the SIMPLE controller is based upon a 386 AT-like processor 400. The processor 400 operates on SIMPLE firmware and application software 700 and a data structure 500. Network controller 402 controls the inter-station bus 114. The SERIPLEX I/O controller 404 interfaces to the I/O network 306. A parallel to serial I/O interface 406 communicates with the motion bus 308. A complete SERIPLEX I/O interface is indicated at 408. A motion control interface, including the CMC 316 and the digital drives 318, is indicated at 410. There are several ways to implement the parallel to serial controller 406 which typically includes the use of industry standard RS-485 or RS-422 interface cards plugged into the AT ISA bus of the computer.

The preferred embodiment of the invention as shown in FIGS. 1 through 4 of the drawings is implemented and networked using IBM AT compatible personal computers (PC-AT) having INTEL 80386 microprocessors or any such system capable of providing a multi-tasking environment and a windows-style user interface such as that provided by the Microsoft Windows Software. In the preferred embodiment, Microsoft's MS-DOS operating system is used. The graphics library used is a standard package called GFX produced by C Source, Inc., Kansas City, Mo. As depicted in FIG. 4, each controller 200 must also have adequate input and output ports to provide for communications with the various devices and sensors utilized on the transfer line 104. The PC-AT 386 computers have an ISA standard bus, two serial communication ports (COM 1 and COM 2), one parallel port, and standard ISA bus interrupt support. A memory-mapped I/O scheme is also implemented within the memory space of the microprocessor for setting and detecting individual bit levels associated with the various devices and sensors. The DMA capabilities provided on the standard PC-AT computer are not utilized in this preferred embodiment, but may be used to provide additional I/O channels if desired. The parallel port is used to receive input from the panel switches. One serial port receives touch input from conventional touch screen hardware. The touch screen EGA graphics is mapped into the address space of the microprocessor, as is conventional. The remaining serial port interfaces with the key security system.

While a standard AT-type keyboard or even a mouse may be utilized for input, each controller 200 in the preferred embodiment is equipped with a touch screen 210. In the preferred embodiment, the touch screen 210 is a flat panel display equipped with a Dale planer EL touch screen system having EGA 640×350 resolution on the video display unit (VDU). The touch screen 210 is utilized as the primary input device for the controller 200. The VDU is operated in EGA mode, and the touch screen is interfaced through the COM 1 serial communications port and interrupts the processor for receiving the X-Y coordinate information. A conventional touch screen driver and graphics package is provided as part of the software. In addition to menu selection, the touch screen/graphics package also provides a QWERTY keyboard on the VDU for input.

Since the controller 200 is intended to operate under adverse conditions, in addition to using a touch screen system in the preferred embodiment, disk storage devices are not utilized. Instead, the MS-DOS operating system and other system software is stored in a "FLASH" memory, programmable, read-only memory (PROM) chip which emulates a disk drive. The FLASH memory disk drive is assigned to a particular disk location, typically, the "A:" drive, and otherwise operates as a regular disk drive. The FLASH memory disk can also be provided by any industry standard non-volatile memory system, such as a battery-backed, random access memory (RAM) card configured as an "A:" disk drive. The main objective is to provide a system in which moving parts are not utilized and thus not subject to breakdown due to the presence of airborne metal particles or other contaminants which are common in a machining environment. For development and testing purposes, a floppy disk drive may be provided as disk B:.

For security, a security system based on a PROM key interface 208 utilizes a DATAKEY hardware interface provided on the COM 2 port. The key system utilizes an electrically erasable programmable read-only memory (EEPROM) mounted on a key and referred to as a "DATA KEY". The system checks whether the key is inserted at the security key interface 208 and reads the various codes programmed into the PROM key. This sets up a prioritized security system for verifying the user's clearance for invoking functions and whether the user may edit programs. There are four security authorization levels:

1) operator level,
2) maintenance level,
3) engineering level, and
4) master level A warning indicating "insufficient security level for this function" appears if the user attempts a function for which the user lacks the proper authorization, and the function is thus not executed. The inter-station network 114 is a bus or star, token passing, or CSMA network architecture with custom software drivers such as those provided by ARC-NET which is widely used in this application. Ethernet or IBM Token Ring could be used instead.

Figure 5:
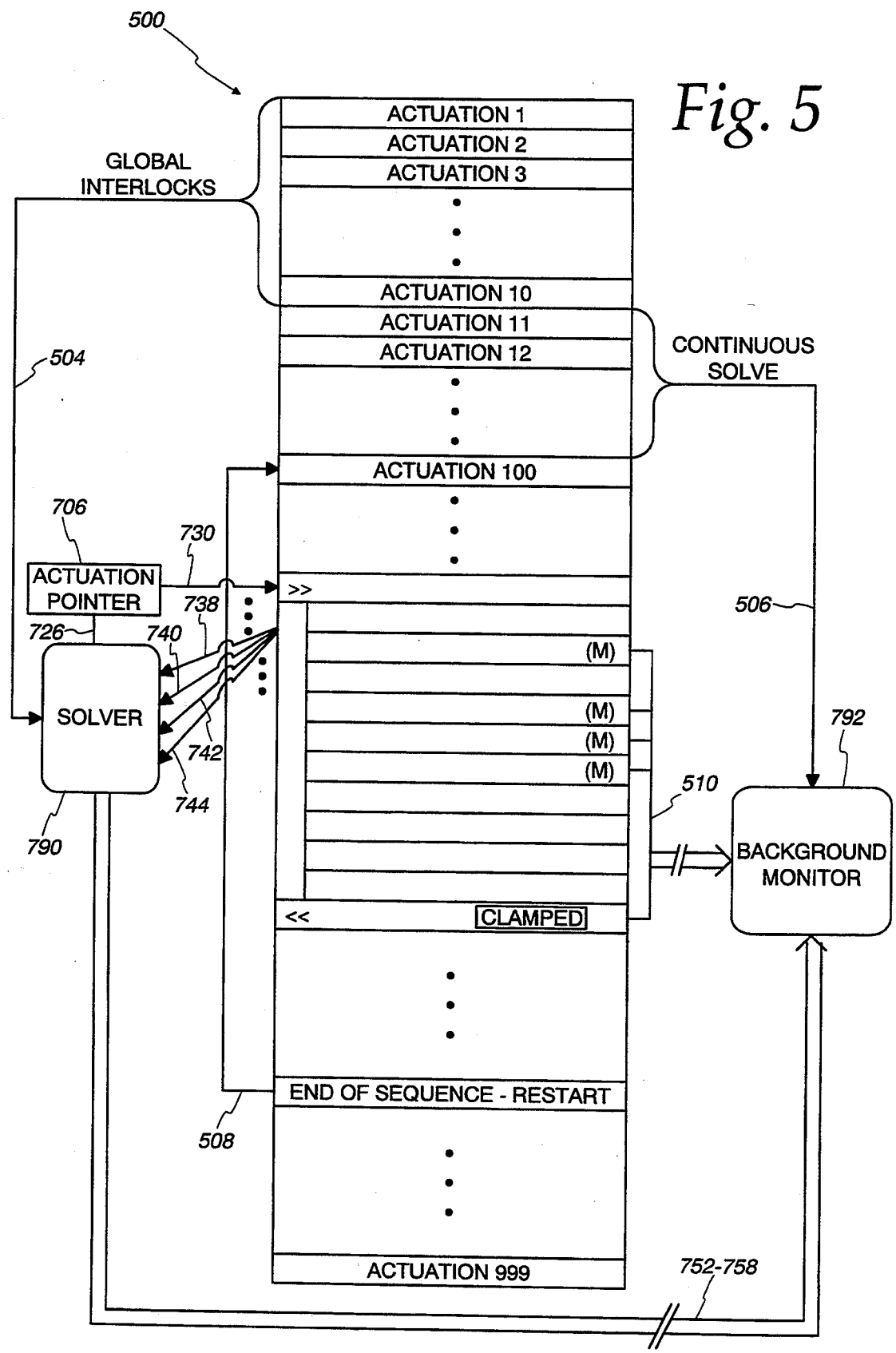
FIG. 5 is a program data structure having sequential actuations which are executed by the SIMPLE controller.

Turning now to FIG. 5, the data structure 500, as illustrated, is a sequence of actuations 502 which are executed by the controller 200 to control and monitor operations at the controller 200. The actuations 502 are entered as a sequential list of steps hereafter referred to as actuations. The five primary program actuations are shown in terms of their functions in FIG. 6 in the table 600. The individual control actuations are illustrated in more detail in FIGS. 14 through 18, and additional program actuations which may be utilized as actuations 502 are illustrated in FIGS. 19 through 26.

FIG. 5 shows a series of actuations which together comprise a subsequence starting at 503. The inward point chevron at the first actuation of the subsequence starts the subsequence, and the outward pointing chevron in the last actuation of the subsequence ends the subsequence. The network output "CLAMPED" is sent out from the actuation having the outward pointing chevron. The network output is a summary of all of the conditions marked for monitoring in the subsequence herein indicating that the station is clamped. The actuations marked for monitoring, as indicated by the "(M)" at the end of the actuations, are connected with the summary output "CLAMPED" and sent to a background monitor 792 through dataflow 510.

The data structure 500 pictorially illustrates processing flows for the sequential execution of the actuations. The actuations are sent to a solver 790 which operates upon actuation start, during, end, and timeout conditions or interlocks with dataflow 738, 740, 742, and 744, respectively. (Detailed operation of the program control flow structure is discussed further at FIG. 7A and FIG. 7B.) Actuations are selected from an actuation pointer module 706 which controls dataflow actuation pointer 730. The actuation pointer information is conveyed to the solver 790 through dataflow 726. The actuation data space in data structure 500 is broken up into three parts: (1) global interlocks (actuations 1–10); (2) continuous solve (actuations 11–99); and (3) general actuation data space (actuations 100–999). Global interlocks must be satisfied for all actuations as an extension of the start interlocks. The global interlocks are conveyed to the solver 790 via dataflow 504. The continuous solve actuations are special actuations which are continuously solved, such actuations are presented to the background monitor 792 via dataflow 506. The solver 790 and the background monitor 792 are connected via dataflow lines for end-state, implied, continuous, and suspend, indicated as 752, 754, 756, and 758, respectively, which are discussed further below.

The actuation data space in data structure 500 provides data storage allocation means for allocating space for the storage of blocks of data forming the actuations. As discussed above and in accordance with the present invention, the actuations thus each define sequential operations having an interlock defining the operation's onset, an interlock defining the operation's continuation, and an interlock defining the operation's completion, and at least some of said actuations also have linkages to other actuations which linkages define executable sequences of actuations.

Generally, actuation sequences start at actuation 100 and may continue through actuation 999 which comprises the general data space for the actuations. As illustrated in FIG. 5, the actuation sequence ends at an actuation termed "end of sequence-restart" which causes the actuation pointer to reset at actuation 100 as indicated by line 508. It is of particular importance to the present invention that the actuation data space, as illustrated by data structure 500, is highly specialized for sequential operations such as those utilized by transfer lines. The background monitoring solving and interlocks facilitate efficient operation of the controlled transfer line through effective tools for diagnostics and logic annunciation.

Turning now to FIG. 6, the general form of the data structures that govern monitoring and control are illustrated in table form. Of particular importance is the use of each named and numbered sequence actuation 602 in conjunction with designated interlocks 604 as is defined in the table 600. Five types of program control actuations are illustrated in table 600: the START OF SUBSEQUENCE actuation 1400; the DISCRETE OUTPUT actuation 1500; the MOTION actuation 1600; the END OF SUBSEQUENCE actuation 1700; and the CONTINUOUS SOLVE actuation 1800. The interlocks are carried out through the use of a novel data structure which facilitates background monitoring of "start", "during", and "end" conditions to ensure that: the particular logic actuation may be utilized as a single actuation 502 in the program data structure 500; that the monitoring functions of general input and output in similar fashion defined by each actuation remain active following the execution of each actuation 502 until later canceled; and that the particular actuation may be actuated manually under safeguard interlock control, when in the manual mode of operation.

The "start" column indicates boolean conditions necessary for starting a sequence actuation. The start of subsequence start condition is a general input. The Boolean conditions for the remaining actuations indicate states. In the "during" column, a Boolean expression representing conditions occurring during the execution of each actuation. The "end" column shows Boolean expressions representing conditions signifying the end of each actuation and is used for background monitoring after the execution of the actuation.

The SIMPLE firmware 700 monitors the expected time and elapsed time columns. The expected time is user definable at the display and touch screen assembly 210. The elapsed time is a RAM variable storing the time of the actual operation of the discrete output or motion actuation. If the elapsed time exceeds the expected time, a watchdog timer function is triggered and the user is alerted of the fault. Optionally, the user can determine if the fault is to stop the sequencer.

The last column in table 600 is "staple", which is further broken down into the previous and next, designated by an up arrow and a down arrow, respectively. "Staple" allows an actuation to be connected with another adjacent actuation. "Stapling" thus allows for the concurrent execution of two or more actuations. The "staple" function allows parallel processing of actuations within the sequence structure.

The actuation label under the sequence column allows the user to define a name for each actuation and provides 40 characters for the name definition. (Other aspects of table 600 will be explained below.)

Figure 7A:
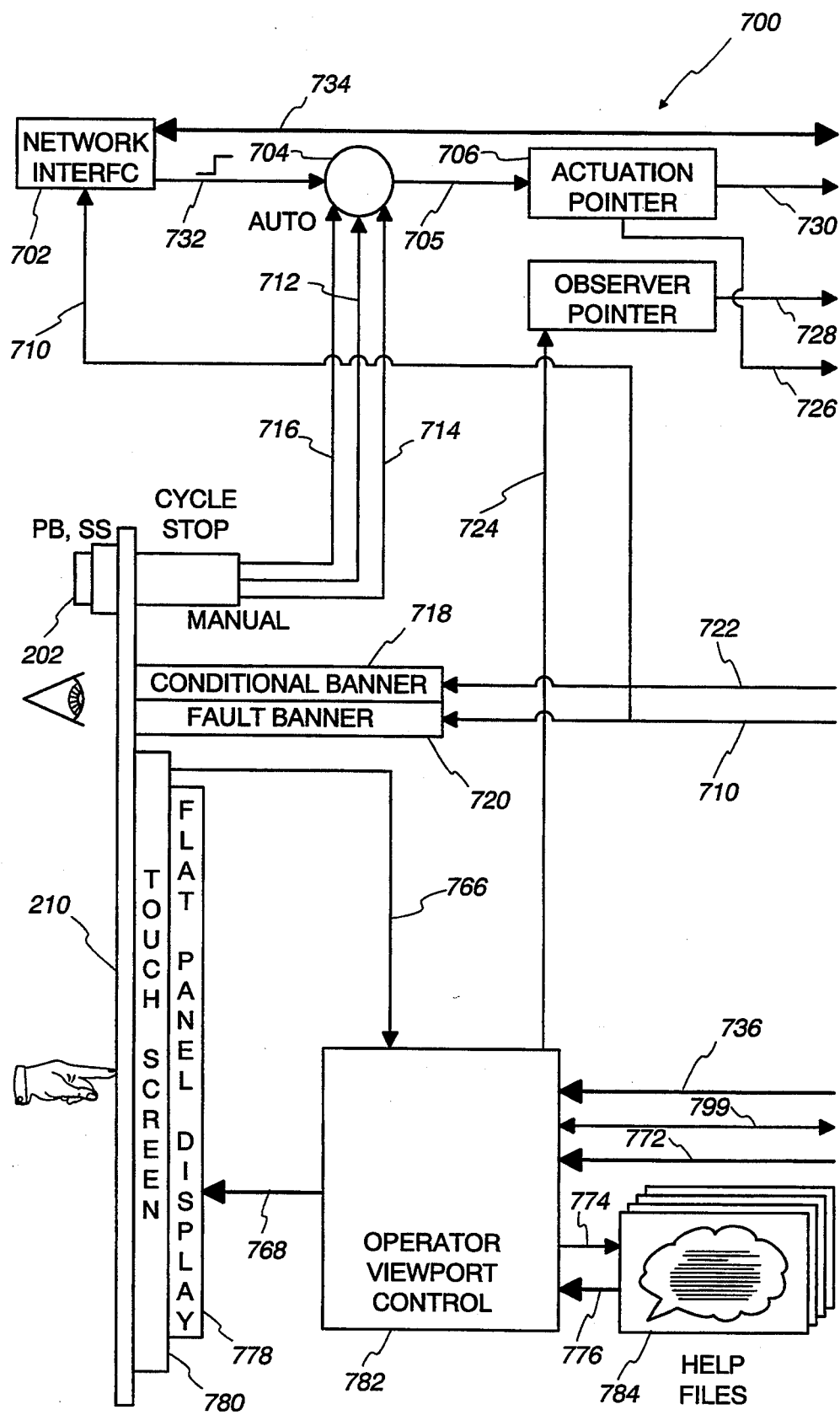
FIGS. 7A and 7B are a program flow diagram illustrating the SIMPLE controller program structure.
Figure 7B:
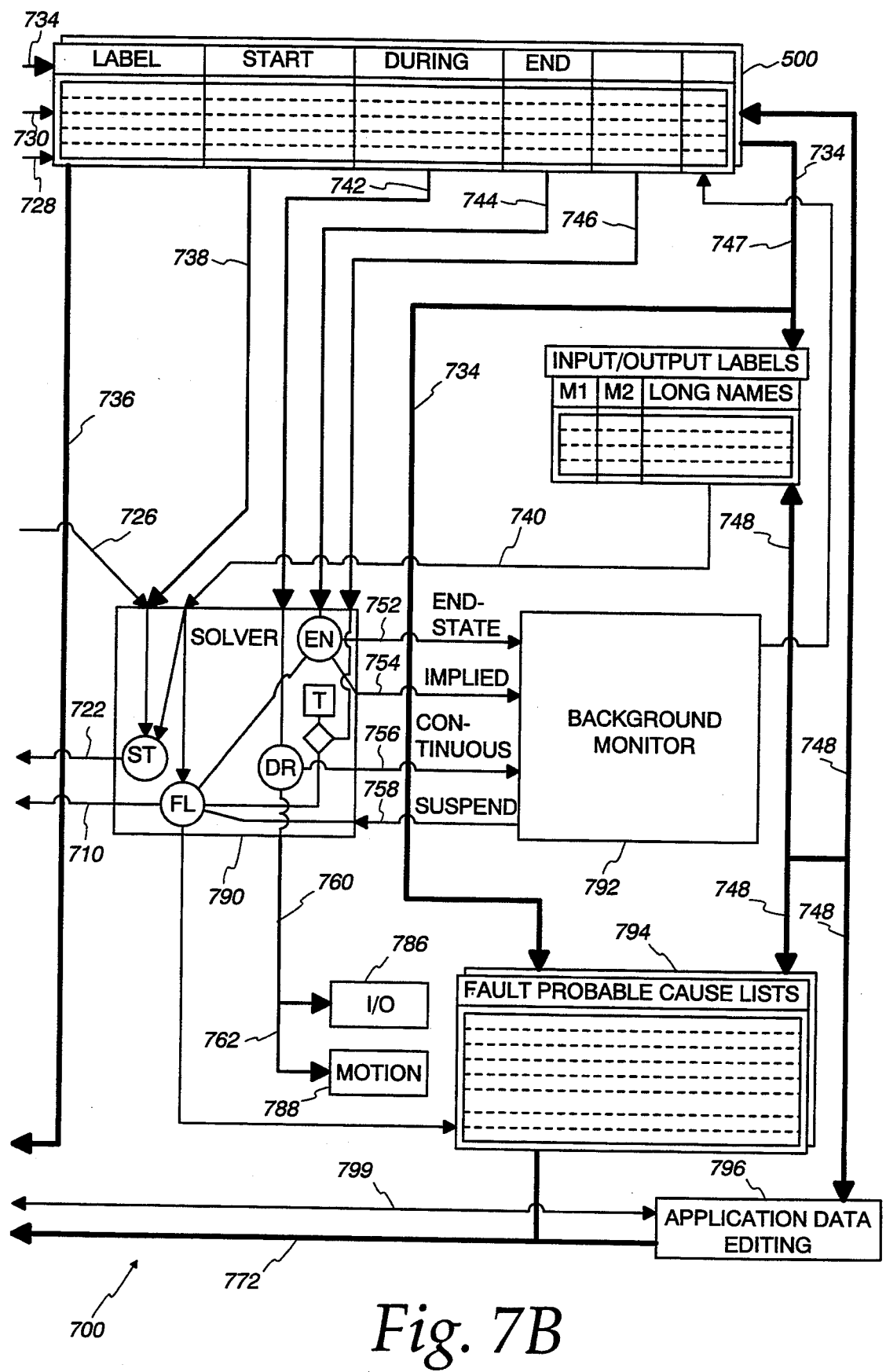

The SIMPLE controller program structure is illustrated generally at 700 in FIGS. 7A and 7B. Network interface 702 facilitates communication over the interstation network 114 over which commands are received from the synchronizer and responses are sent to the synchronizer from the controller 200. The network interface signal 732 is then relayed to the actuation pointer mode 704 which determines the mode from the position switch 202 which provides input in terms of the auto signal 712 manual 714 and cycle stop 716 to the actuation pointer mode 704. The mode is conveyed to the actuation pointer 706 via signal 705. The actuation pointer itself is indicated as actuation pointer 730. An observer pointer module 708 controls an observer pointer 728. The actuation pointer 730 and observer pointer 728 index the program data structure 500. Program data structure information is relayed back to the interstation network via signal flow 734.

Solver 790 interprets the program data structure 500 serving as the execution engine for the SIMPLE controller program. Solver 790 interprets and evaluates start conditions, processes during outcomes, and verifies end conditions, using the watchdog timer values as they relate to the data structure 500. The Solver 790 operates by having access to the data structure 500 for executing the operations called for by the actuations either in automatic sequence in accordance with the linkages or in response to manual requests from the operator.

The start conditions task provides a user understandable message on the conditional banner 718 via output signal 722. The message assembled from the fault module within the Solver 790 provides user understandable indications at fault banner 720 via output signal 710. The Solver 790 encompasses the start, during, end, and fault tasks utilizing the activation pointer 726 to assess start condition input 738, during condition 742, end condition 744, and watchdog timer input 746. The message is assembled from user defined long names and mnemonic for I/O provided via input 740 from the names data structure 798. The user creates and edits application data via the edit processor 796 on data path 748 for the I/O names data structure 798, fault probable list 794 and the program data structure 500. The fault task directs a probable cause via window 764 for display via data path 772 to screen 210.

Background monitor 792 operates as a program module which facilitates continuous background checking of interlock conditions and actuation end-states. Intelligent monitoring of the actuations, a key aspect of the present invention, is implemented the background monitor 792. End-state input 752, implied input 754, based upon end of subsequence direction, provide end-state conditional information to background monitor 792. Continuous input 756 provides a path for a continuous solving actuation. Suspend output 758 facilitates fault monitoring displays to the operator as well as interrupt the next actuation until operator acknowledgement.

An end state flag 747 is provided from the background monitor 792 to data structure 500. For any given actuation, the background monitor sets the end state of the completion interlock. The end state flag 747 is recorded in RAM in the data structure 500, and is conveyed over data flow 736 to the screen (FIG. 30), where selected block numbers in the column 729 are highlighted, or are not highlighted, to reflect the status of the corresponding end state flag value. From the user's perspective, viewing FIG. 30, the highlighted block numbers indicate which actuations have their end states satisfied. The user is thus readily able to discern which end states remain unsatisfied.

In operation, the actuations which make up the process defining the transfer line operations will execute in sequential order except stapled actuations which execute in parallel. As the actuations are completed with their end states satisfied, the animated representations of the actuations (e.g. FIG. 30) become highlighted indicating their completion and satisfaction of end states as indicated from end state flag 747 from the background monitor 792. As one can readily appreciate, this helps make the transfer line process inherently apparent to the user. The user may use this end state information in deciding whether to proceed with a contemplated manual operation at a workstation, or whether to modify a sequence among various other decisions the ramifications of which are much more readily apparent to the user through the actuation pointer 730 and end state flag 747.

By having access to the data structure 500, the background monitor 792 is thus called upon by the solver 790 at appropriate times to monitor the various boolean expressions utilized with the interlocks, to notify the solver 790 and, in at least some instances, to set forth one or more alarms to the user to provide an indication of when there is a change in the state of any monitored interlocks.

An additional key aspect of the present invention is facilitated through the operator viewport control module 782 which drives the flat panel display 778 with output dataflow 768 and takes information from the user via touch screen 780 and touch screen input 766. In this way the user, as illustrated in FIGS. 7A and 7B, views the conditional banner 718 and the fault banner 720 and the user may make appropriate changes via the touch screen 780 in order to rectify problems with the controlled process.

To assist the user, help files 784 have been created and are presented to the operator viewport control 782 via input 776. The help files 784 are invoked from the operator viewport control 782 from signal 774. The operator viewport control 782 also takes as input actuation label information and interlock definitions 736 as appropriate from data structure 500. The operator viewport control 782 interacts with the application data editing module 796 via control line 799. The operator viewport control 782 provides input to the observer pointer 708 via input 724.

The main processes which facilitate the operation of the SIMPLE controller structure are the operator viewport control 782 which drives the man-machine interface (MMI) and the Solver 790, background monitor 792 and application data editing 796. These four software modules facilitate the sequential actuation execution and background interlock checking and thus facilitate the implementation of a distributed computing approach to a transfer line system. Furthermore, the operator viewport control 782, in conjunction with touch screen 780, allows random selection and execution of modules by the user and at the same time the process is made apparent to the user via the flat panel display 778.

Figure 8:
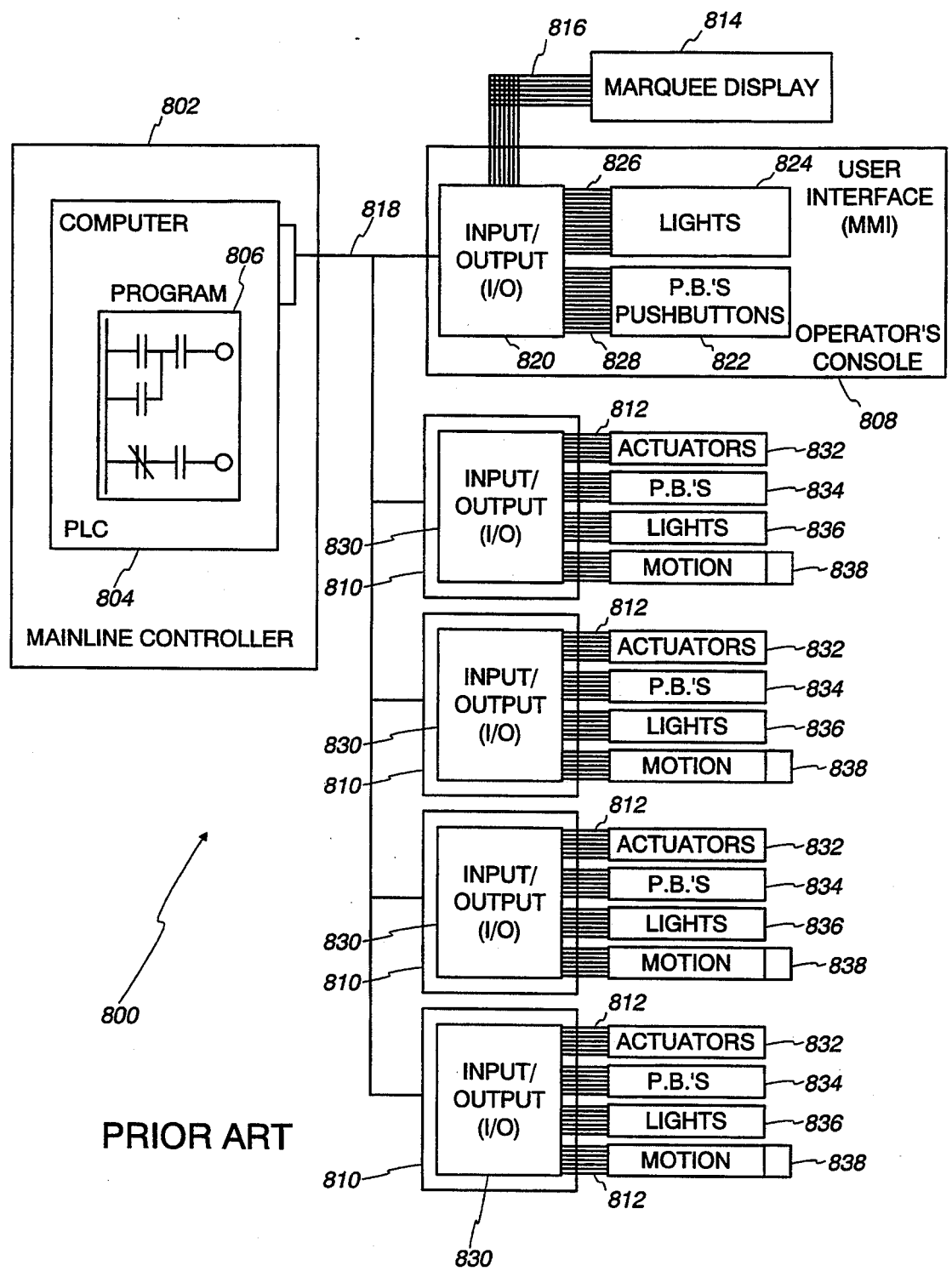
FIG. 8 is a block diagram illustrating a prior art transfer machine control system utilizing centralized processing and remote I/O system.

Turning now to FIG. 8, a prior art transfer line control system utilizing centralized computer processing with a Programmable Logic Controller (PLC), and remote I/O is illustrated generally at 800. The main line controller 802 includes a PLC 804 and ladder logic program 806. The main line controller 804 represents all of the computer processing for the entire transfer machine. The transfer machine is controlled via I/O line 818. The user interacts with the transfer machine via the operator's console 808 which provides a user interface via lights 824 and pushbuttons (P.B.'s) 822. A marquee display 814 alerts users of conditions of the transfer machine. Input/output (I/O) module 820 provides the user with information and relays user input back to the PLC 804. The marquee display is driven by output lines 816, lights by output lines 826 and the pushbuttons 822 are read on lines 828. Prior art standard station controllers are illustrated at 810. The station controllers 810 have no computing abilities and all functions are carried out via input output (I/O) modules 830. I/O modules 830 drive actuators 832, read pushbuttons 834, drive lights 836, and motion control 838 via I/O lines 812. It should be immediately clear that the prior art transfer line system 800 requires a very complex ladder logic program 806 and extensive I/O requirements on I/O lines 818. Significant wiring is required for operating such a transfer machine system.

Figure 9:
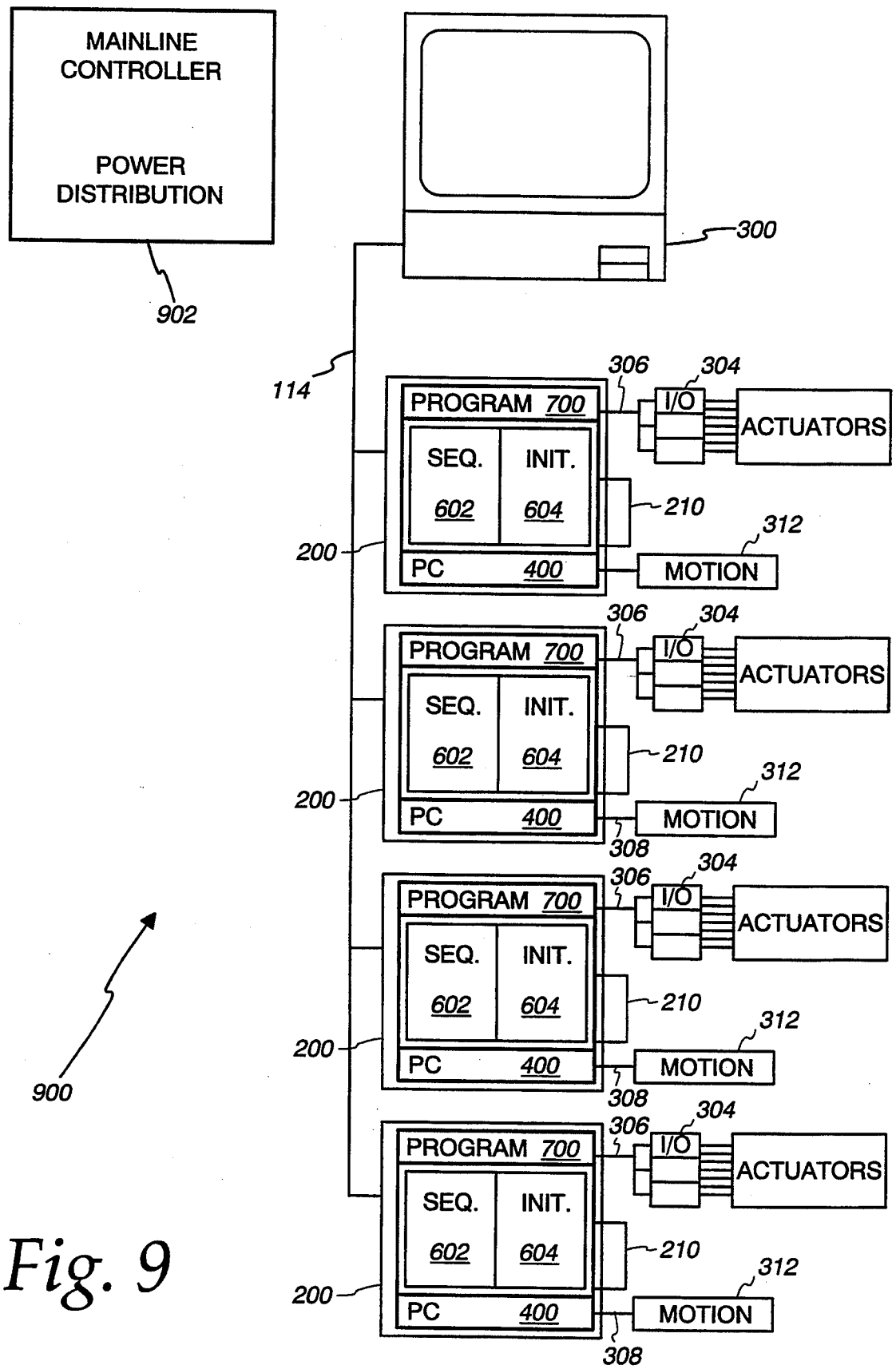
FIG. 9 is a block diagram illustrating a transfer machine control system according to the present invention utilizing distributed computing through networked SIMPLE controllers.

Turning now to FIG. 9, a block diagram illustrating a transfer machine control system according to the present invention utilizing distributed computing through networked SIMPLE controllers is illustrated generally at 900. The main line controller 902 no longer performs any computing. It merely serves for power distribution.

Figure 10:
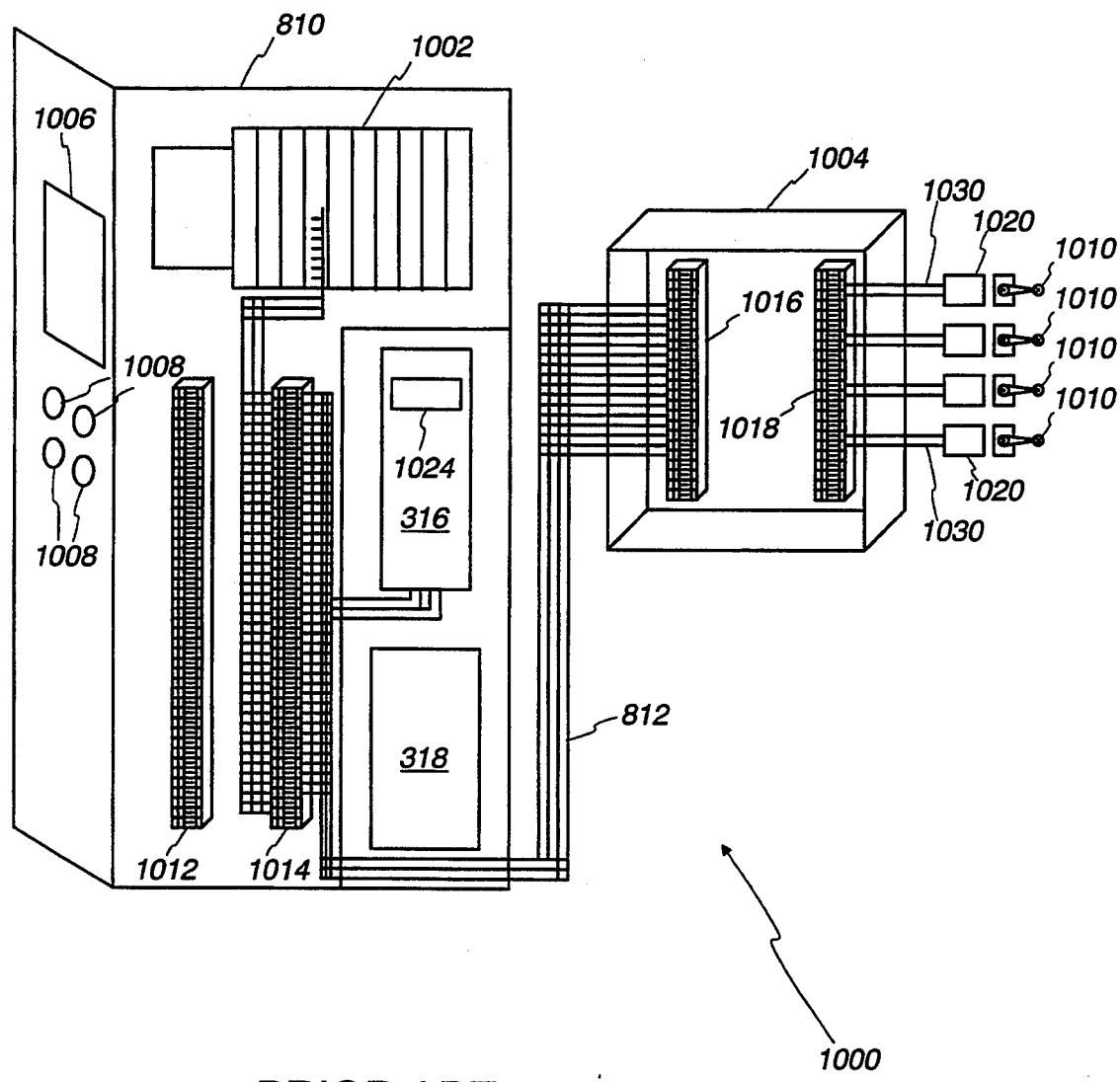
FIG. 10 is a prior art standard station controller.
Figure 11:
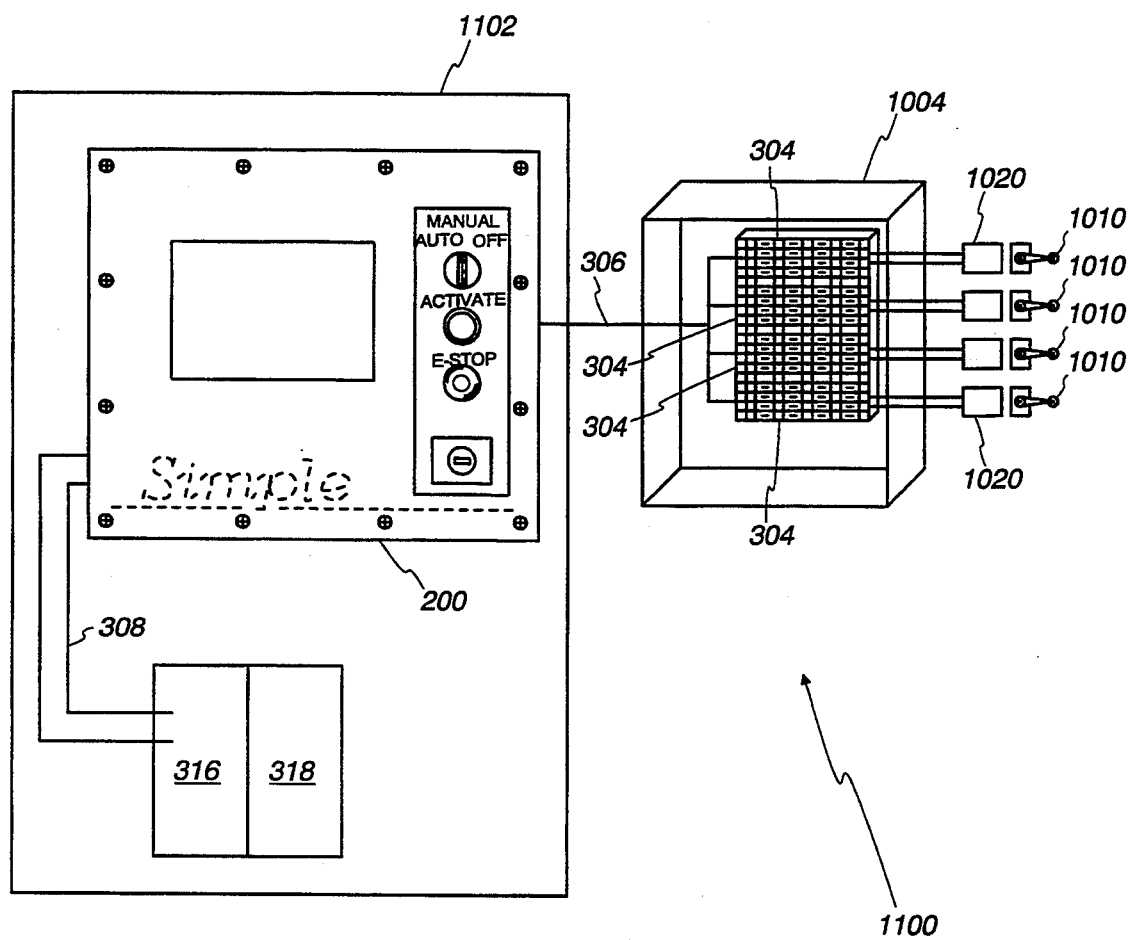
FIG. 11 is a station controller according to the present invention.

Turning now to FIGS. 10 and 11, one can readily compare the vastly different station controller configurations. A prior art standard station controller is shown generally at 1000 and a station controller according to the present invention is shown generally at 1100. The user interface provided in the prior art controller is provided through lights 1006, pushbuttons 1008, and display 1024. Extensive I/O wiring requirements are facilitated through I/O interface from PLC at 1002 and wiring terminal strip 1012 and wiring terminal strip having wires connected therein at 1014. Motion control is provided through a CMC 316. This CMC utilizes CMC operator interface 1024. The CMC 316 controls the motor drive 318. Wiring posts 1010 in junction box 1004 provide input and output from devices and sensors 1020. I/O connections to junction box 1004 are wired from cables 812 to connection strip 1016. One can really appreciate that the wiring requirements for the prior art station controller 1000 are extensive.

By comparison, the controller 1100, according to the present invention, has minimal I/O wiring requirements. The SIMPLE controller 200 and CMC 316 are indicated as an assembly at 1102. The CMC operator interface 1024 is no longer required and replaced by the SIMPLE controller 200. The extensive wiring to wire strips 1016 and 1018 have been replaced by the SERIPLEX modules 304. Since the SERIPLEX modules 304 are intelligent I/O modules, the only connection to the module is through the I/O bus 306.

Figure 12:
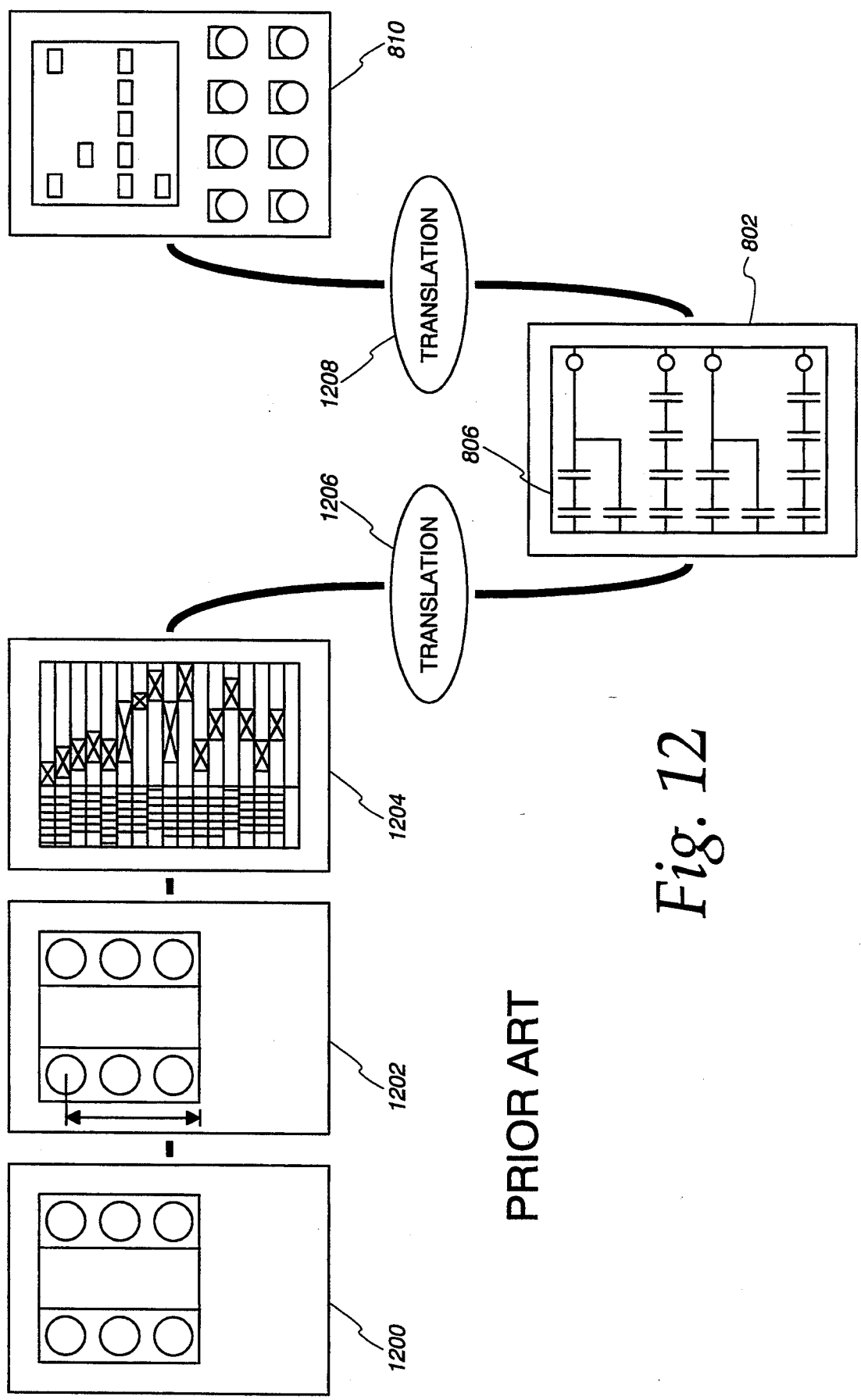
FIG. 12 illustrates the prior art traditional transfer line design process.
Figure 13:
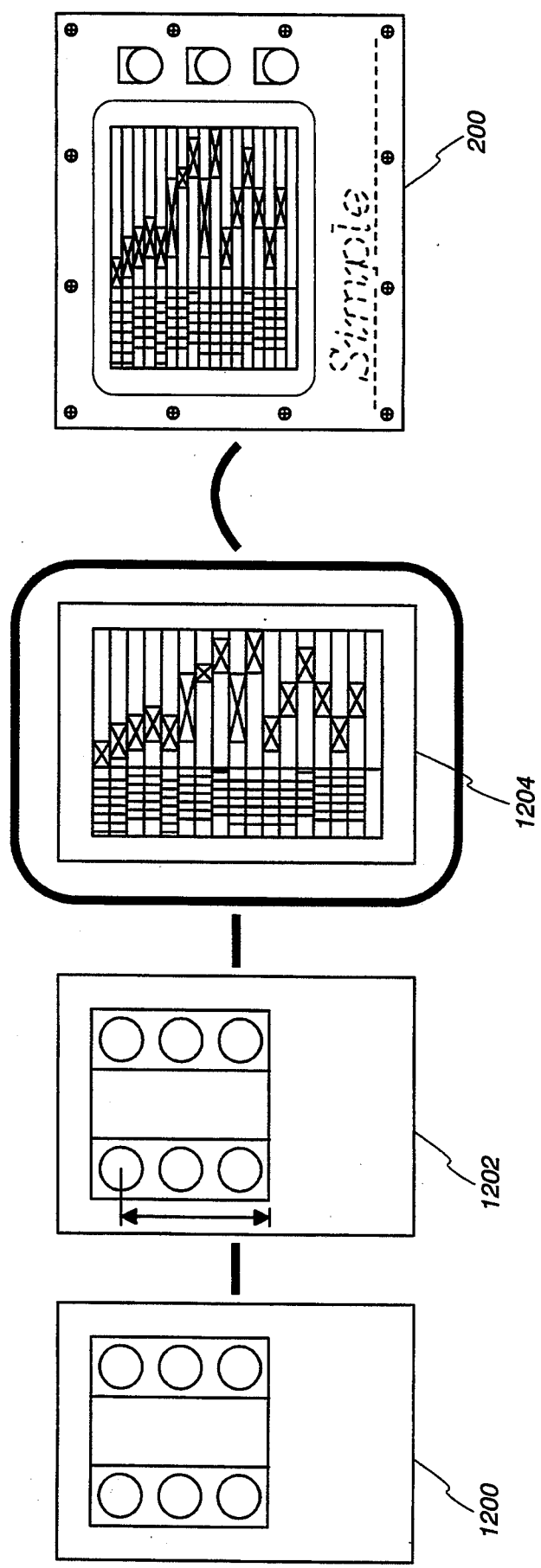
FIG. 13 illustrates the transfer line design process according to the present invention.

Turning now to FIGS. 12 and 13, the differences between the transfer line design process according to the prior art and that according to the present invention are pictorially illustrated. Part features per customer specification are indicated by block 1200. Block 1202 indicates the processing specification per the process engineer's design. Block 1204 represents the production process per the machine designer. Translation 1206 is required in the prior art PLC approach in order to program ladder logic 806 on the main line controller 802. Translation 1208 is again required for operation at the prior art standard station controller 810. By contrast, translations 1206 and 1208 are no longer required to implement the production process of the machine designer. Rather, the process 1204 may be implemented directly on the SIMPLE controller 200, thus making the transfer line easier and more direct to program.

Turning now to FIGS. 14 through 26, the actuation types are indicated in tabular form. The thirteen tables represent very high level actuation definitions which may be utilized as actuations 502 in the program data structure 500. The five tables shown in FIGS. 14 through 18 represent actuation types as a sequence actuation 602 with appropriate interlocks 604.

The START OF SUBSEQUENCE actuation format is indicated generally at 1400. The inward pointing chevron 1402 indicates a place holder for subsequence instruction of the synchronizer. The start of subsequence 1404 actuation type having a user definable ASCII string as a label is thus invoked from a command coming over the interstation network 114. Boolean expression 1406 defines the input that redirects the actuation pointer to the start of subsequence. Release from the background monitor of the complementary state 1408 is implemented as a during condition. The user enters the state to be released at 1410 and the negative true state to be released at 1412. 1414 indicates no end conditions. Expected time 1416 and elapsed time 1418 are not applicable to the start of subsequence 1404. Staple 1420 is also not applicable.

The DISCRETE OUTPUT actuation format is indicated generally at 1500. The discrete output actuation type is indicated at 1502. Start conditions 1504 comprise a Boolean expression of 4 inputs which are user definable. During conditions 1506 also comprise a user definable Boolean expression and discrete output OFF 1518 and discrete output ON 1520. End conditions 1508 is a Boolean expression with 4 inputs. Expected time 1510 and elapsed time 1512 are compared by the watchdog timer within the Solver 790. Staple 1514 allows discrete output 1502 to be executed in conjunction with an immediately adjacent proceeding or subsequent actuation 502. It should be further noted that the monitor flag 1508 may invoke the monitor upon successful completion of the actuation.

The MOTION actuation format is indicated generally at 1600. The actuation type 1602 is indicated as a motion type. Start conditions 1604 comprise a Boolean expression of 4 elements which are defined by the user. During conditions 1606 also provide for Boolean conditions and also provide for an EIA-RS-274 command 1616 wherein position is input at 1618 and feed rate is input at 1620. Feed hold is set at 1622. The end condition is described by Boolean expression 1608. Expected time 1610 and elapsed time 1620 are compared by the watchdog timer with the Solver 790. Staple 614 is available with motion 602.

The END OF SUBSEQUENCE actuation type format is indicated generally at 1700. Outward pointing chevron 702 represents a response communicated from the station controller 200 to the synchronizer 116. The end of subsequence actuation 1704 may be labeled by an ASCII string. Start conditions 1706 represent four Boolean input conditions in an expression. A summary state output is turned OFF at 1718 or turned ON at 1720. Expected time 1712, elapsed time 1714 and staple 1716 are not applicable.

The CONTINUOUS SOLVE actuation format is indicated as actuation type 1802. Once invoked as an actuation 502, this actuation operates continuously in the background monitoring the Boolean expression 1804 of eight input conditions. End conditions 1806, expected time 1808, elapsed time 1809 and staple 1810 are not applicable. Complementary OFF and ON output states are indicated at 1812 and 1814, respectively.

The remaining actuation types represented by the respective tables in FIGS. 19 through 26 are not control actuations as those previously described, but rather operate only to dictate the way in which the actuation pointer 730 proceeds in processing actuations 502 in the data structure 500. The SUSPEND SEQUENCE-WAIT FOR ACTIVATION program table is shown generally at 1900. This actuation type 1902 instructs the controller 200 to wait for user activation from the activate pushbutton 204. END OF SEQUENCE WAIT FOR ACTIVATION is indicated generally at 2000. This actuation type 2002 instructs the actuation pointer 730 to wait for user input at activate pushbutton 204 only after the end of an entire sequence. END OF SEQUENCE AUTOMATIC RESTART is indicated generally at 2100. This actuation type 2102 automatically resumes execution of actuations 502 beginning at actuation 100 from the data structure 500 upon the end of the sequence. An "unused" actuation representing an available space in a sequence is shown in FIG. 22; and the remaining actuations control the two (2) SIMPLE timers, TIMER 1 and TIMER 2. START TIMER 1 is indicated generally at 2300. This actuation type 2302 provides a start signal for one of two timers used to time a series of actuations defined by the user. STOP TIMER 1 is indicated generally at 2400 and indicated by actuation type 2402. START TIMER 2 is indicated generally at 2500 by actuation type 2502 and STOP TIMER 2 is indicated generally at 2600 by actuation type 2602.

Turning now to FIGS. 28 through 41, screen displays appearing on the display and touch screen assembly 210 are illustrated. Shown generally at 2700 is the SIMPLE auxiliary function. "Done" touch screen pushbutton 2702 is one of several touch screen pushbuttons which are created by the GFX graphics package and utilized for input on the SIMPLE controller 200. When done 2702 is depressed by pressing the finger to the space indicated on the screen, the user has indicated that he is done using the auxiliary functions and the monitor sequence screen 3000 is displayed. "Help" touch screen button 2704 provides the user with assistance as to any inputs on the SIMPLE auxiliary functions screen 2700.

Depressing the "edit sequence" touch screen pushbutton 2706 causes the logic programming screen 3800 to appear and allows the user to edit the sequence or actuations. Input monitoring 2708 causes the current input states screen 3100 to appear. Edit input information 2710 causes the select input to edit screen 3200 to appear. Edit security key 2710 requires the appropriate security level and allows user access codes to be altered. Sequence file management 2714 causes the sequence file management screen 2800 to appear. Output monitoring 2716 causes the current output states screen 3400 to appear. Edit output information 2718 causes the select output to edit screen 3500 to appear. Manual output control 2720 causes the manual output control screen 3700 to appear.

The SIMPLE title banner and version number, here 1.5, are indicated at banner 2722. The name 2724, identification 2726, and level 2728 of the inserted security key is displayed.

Figure 28:
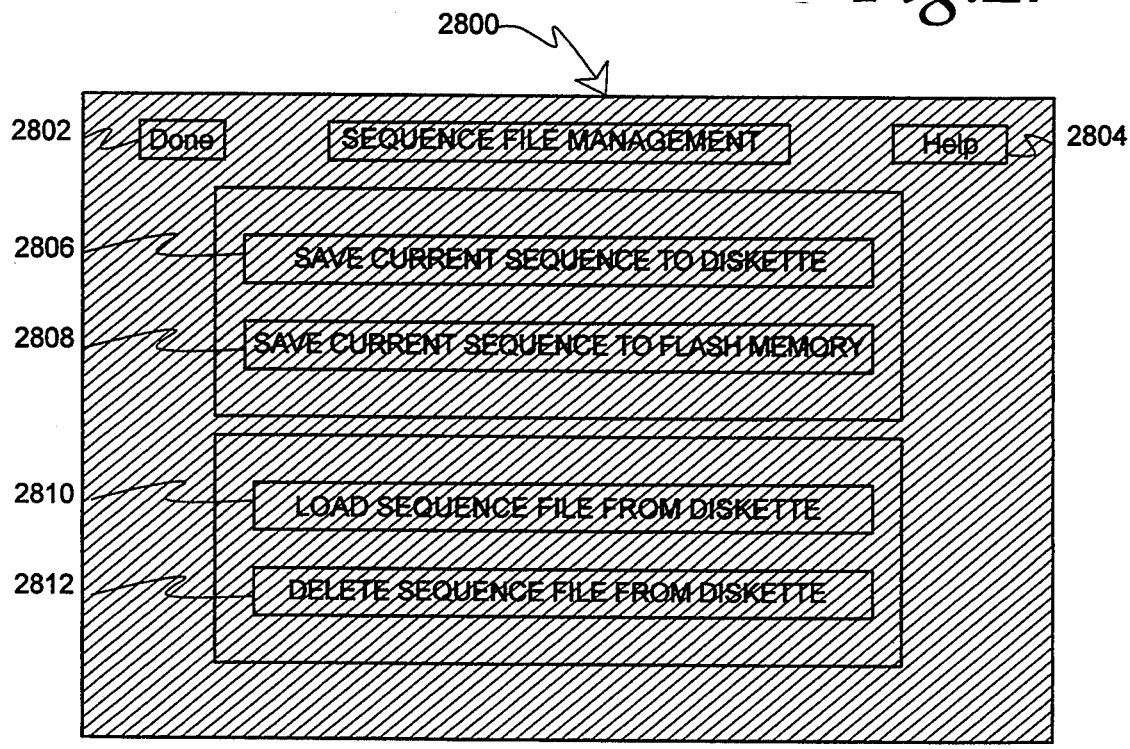
FIG. 28 is the "sequence file management" touch screen display.

Turning now to FIG. 28, the "sequence file management" screen is shown generally at 2800. When the user is done with this screen the done pushbutton 2802 should be depressed. For help, the help pushbutton 2804 should be depressed. Touch screen pushbutton 2806 is used to save the current sequence to diskette. Pushbutton 2808 saves the current sequence to flash memory. Pushbutton 2810 loads a sequence file from a diskette and pushbutton 2812 deletes a sequence file from a diskette.

Figure 29:
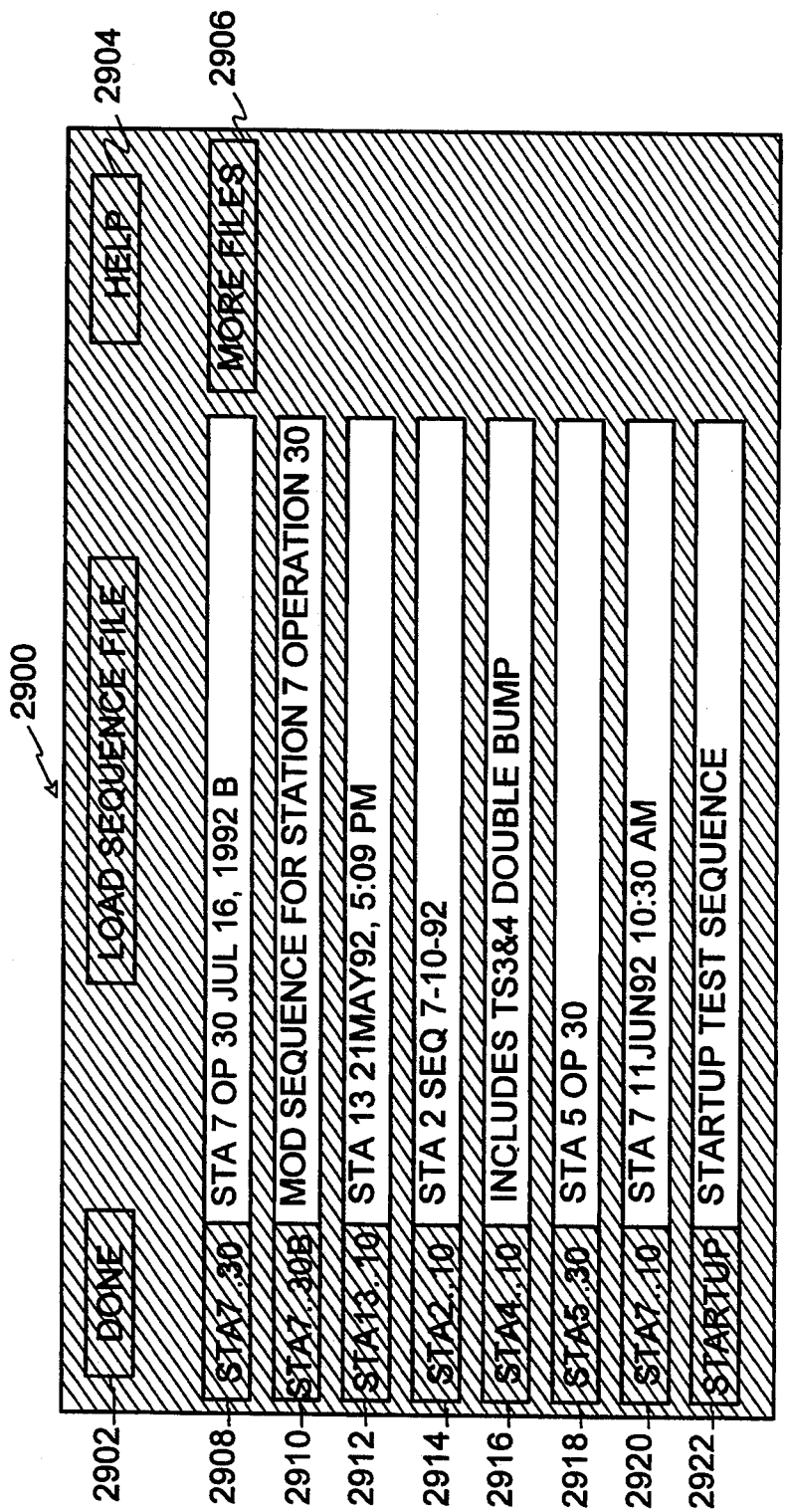
FIG. 29 is the "load sequence file" display.

In FIG. 29, the load sequence file screen is shown generally at 2900. Eight sequence files are shown and may be loaded onto the SIMPLE controller 200. More files may be viewed by depressing pushbutton 2906. When the user is finished, he may depress pushbutton 202. For help with any of the other pushbuttons the user may depress 2904.

Figure 30:
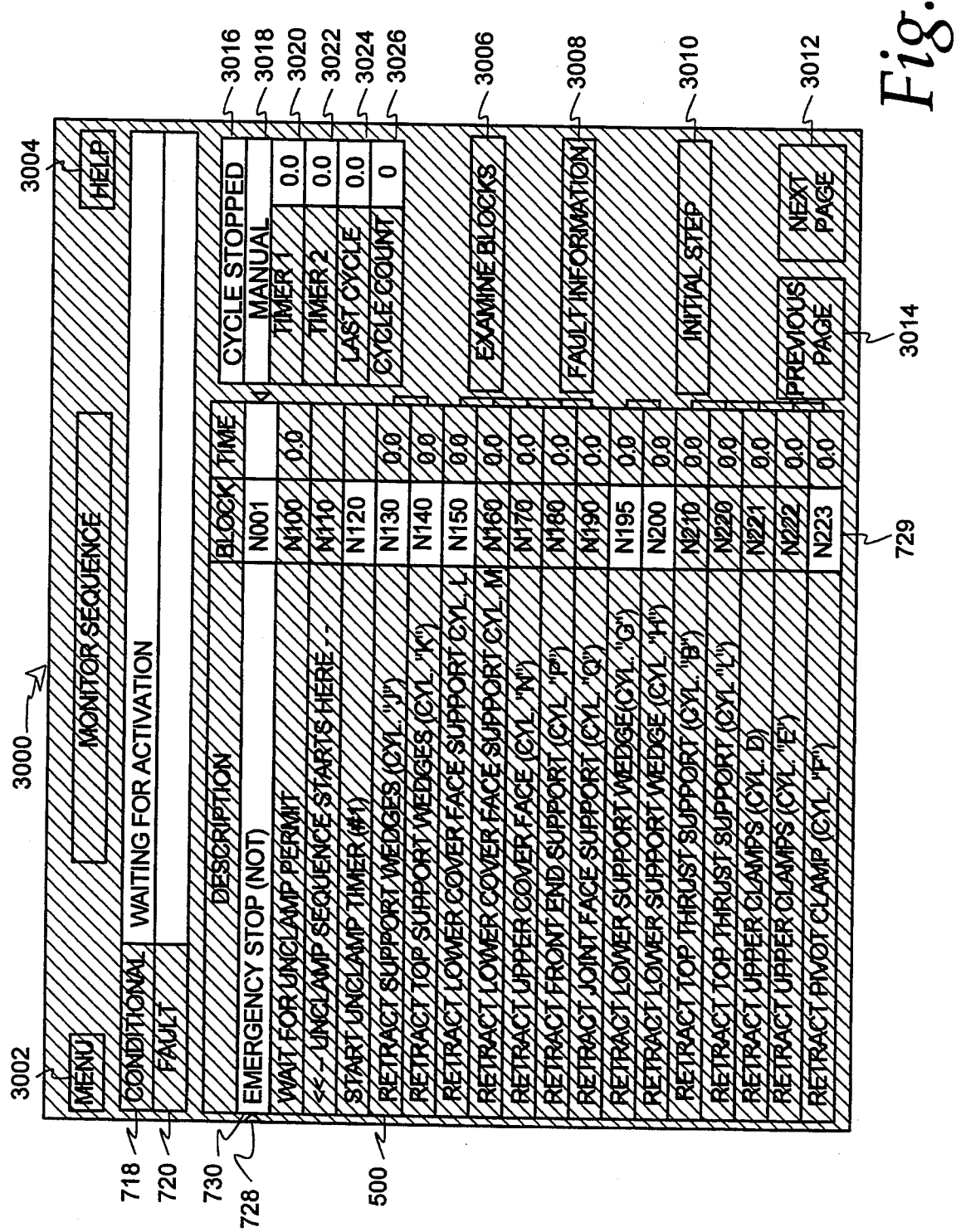
FIG. 30 is the SIMPLE controller's "monitor sequence" display showing the sequential program data structure prepared for interpretation in execution by the SIMPLE controller.

In FIG. 30, the most important user screen is indicated as the "monitor sequence" screen shown generally at 3000. This screen provides the process apparent user interface allowing random selection of program actuations from the displayed data structure 500. The actuation pointer is indicated on the monitor sequence screen at 730. The highlighted actuation represents the actuation pointer. As discussed in conjunction with end state flag 747, the highlighted actuation numbers in the column 729 allows the user to readily discern which actuations have their end states satisfied by merely looking for the actuation numbers in column 729 that remain highlighted as the sequence proceeds with its execution of the actuations. The solid black arrowhead pair represents the observation pointer 728. The actuation number is indicated and elapsed time is represented upon the completion of an actuation. Along the right-hand side of the data structure 500, next to the time column, staple lines are indicated for actuations which may be executed together. Conditional and fault banners are indicated respectively at 718 and 720. Program status is indicated at 3016. Controller mode is indicated at 3018 as determined by the user from selector switch 202. Timer 1 values are presented at 3020. Timer 2 at 3022. Last cycle time is indicated at 3024 and the cycle count is recorded at 3026. Program actuations may be examined by depressing touch screen button 3006. Additional fault information is available from pushbutton 3008. The actuation pointer is returned to the initial actuation by depressing 3010. The next page of sequence actuations may be viewed by depressing pushbutton 3012 and the previous page is viewed by depressing 3014. When the user is done with the monitor sequence screen 3000, he may depress the menu button 3002 which brings the user to the SIMPLE auxiliary functions screen 2700. Help for any of the buttons is provided with touch screen pushbutton 3004.

The monitor sequence screen 3000 is driven by operator viewport control 782 and allows the user access to any of the 999 possible program actuations, as well as allowing the user to program those actuations. In operation, the SIMPLE controller 200 will usually be used with the monitor sequence screen displayed.

Figures 31, 32:
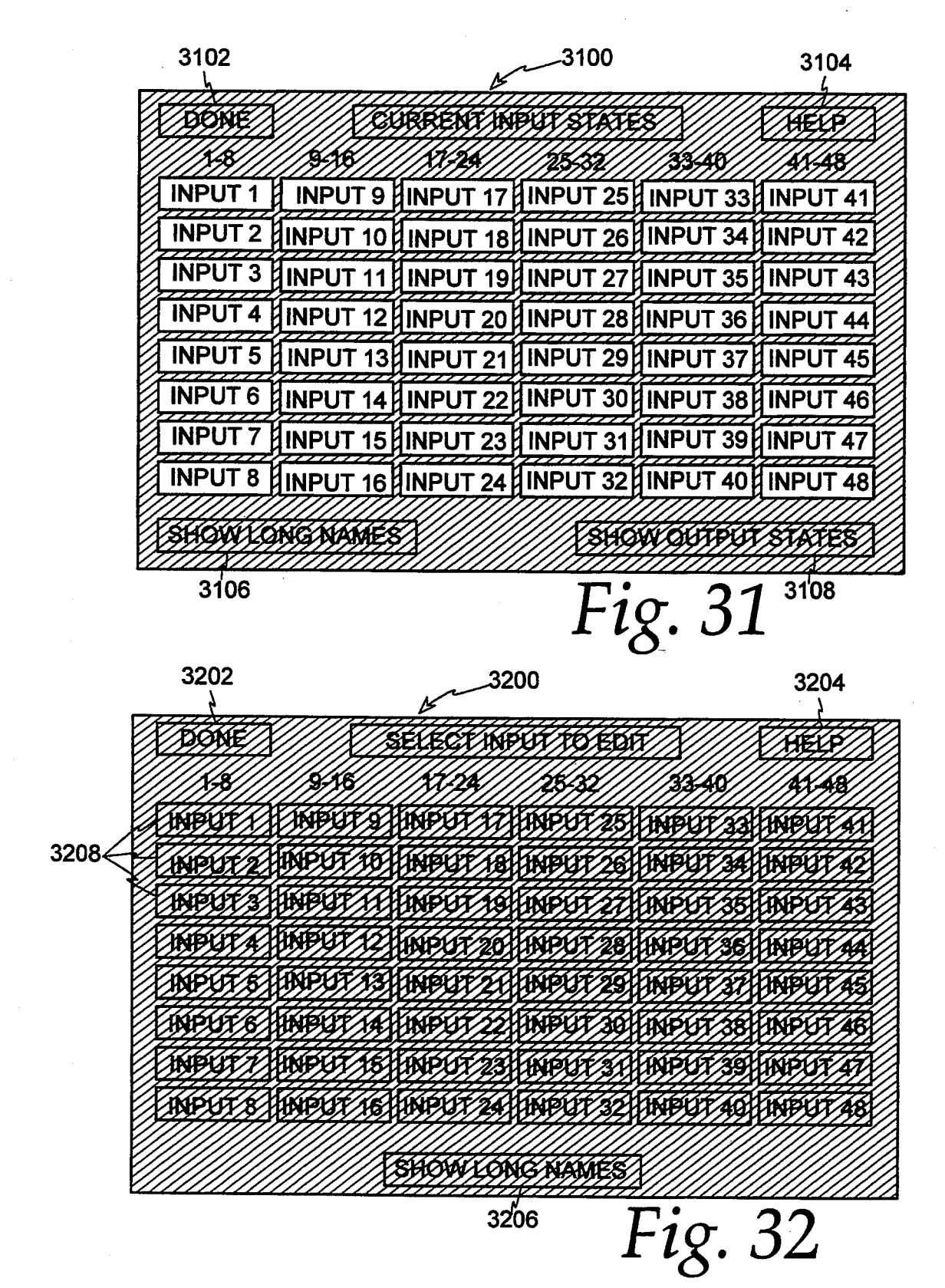
Figure 33:
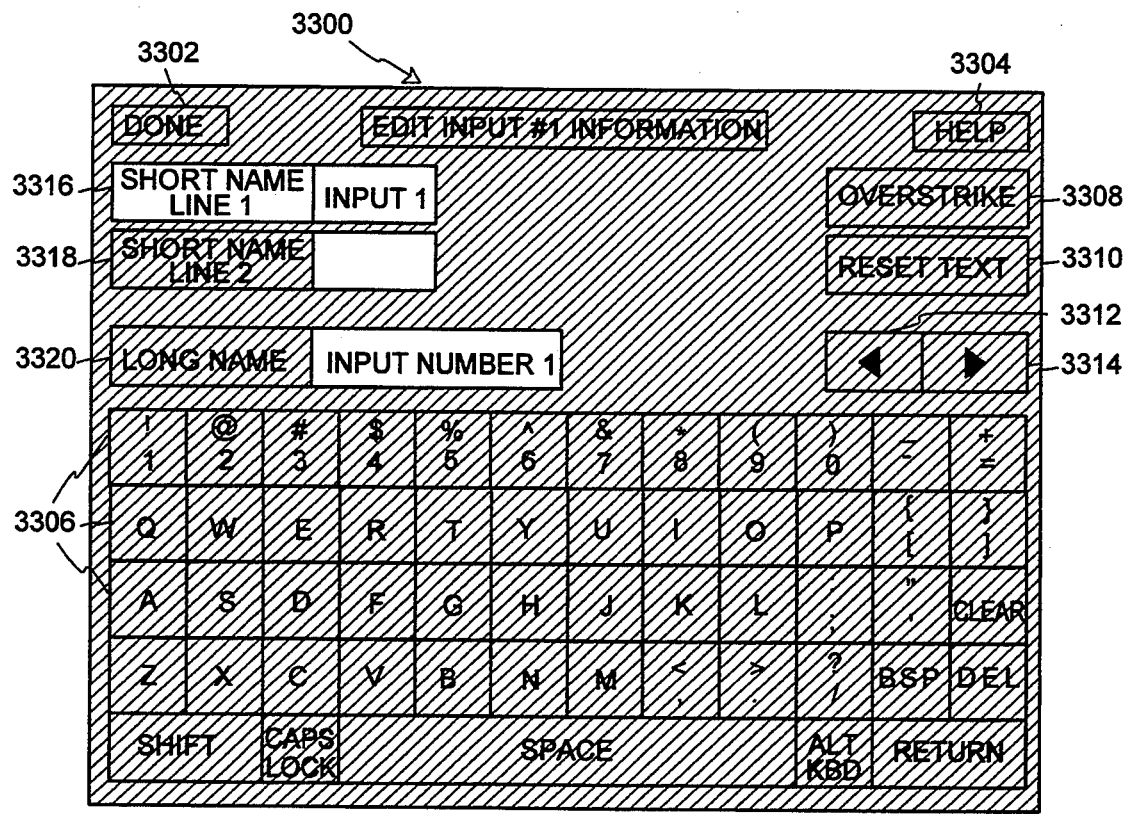
FIG. 33 is an "edit input" screen showing input one and allowing changes with a touch screen QWERTY keyboard.
Figure 34:
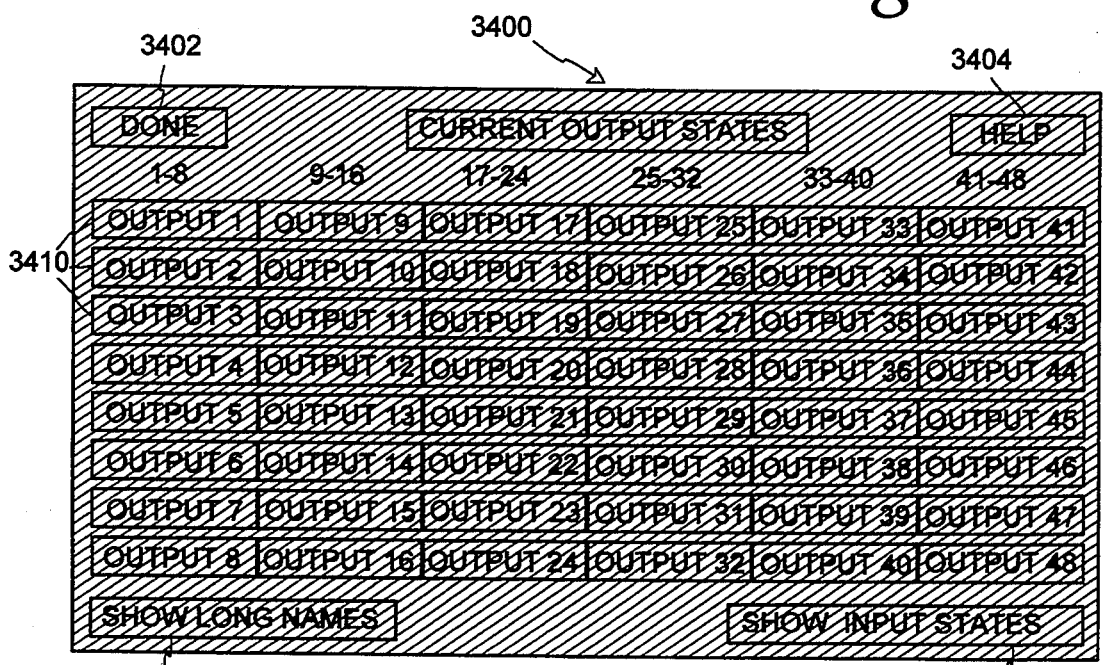
FIG. 34 is the "current output states" display screen.
Figure 35:
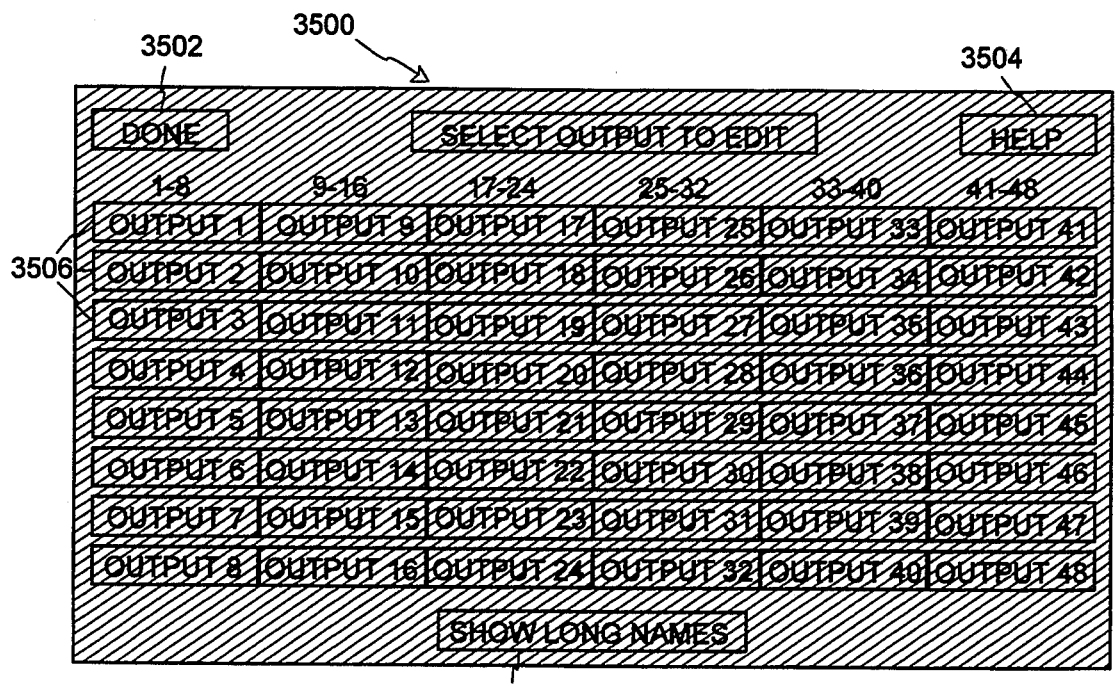
FIG. 35 is the "select output to edit" screen.
Figure 36:
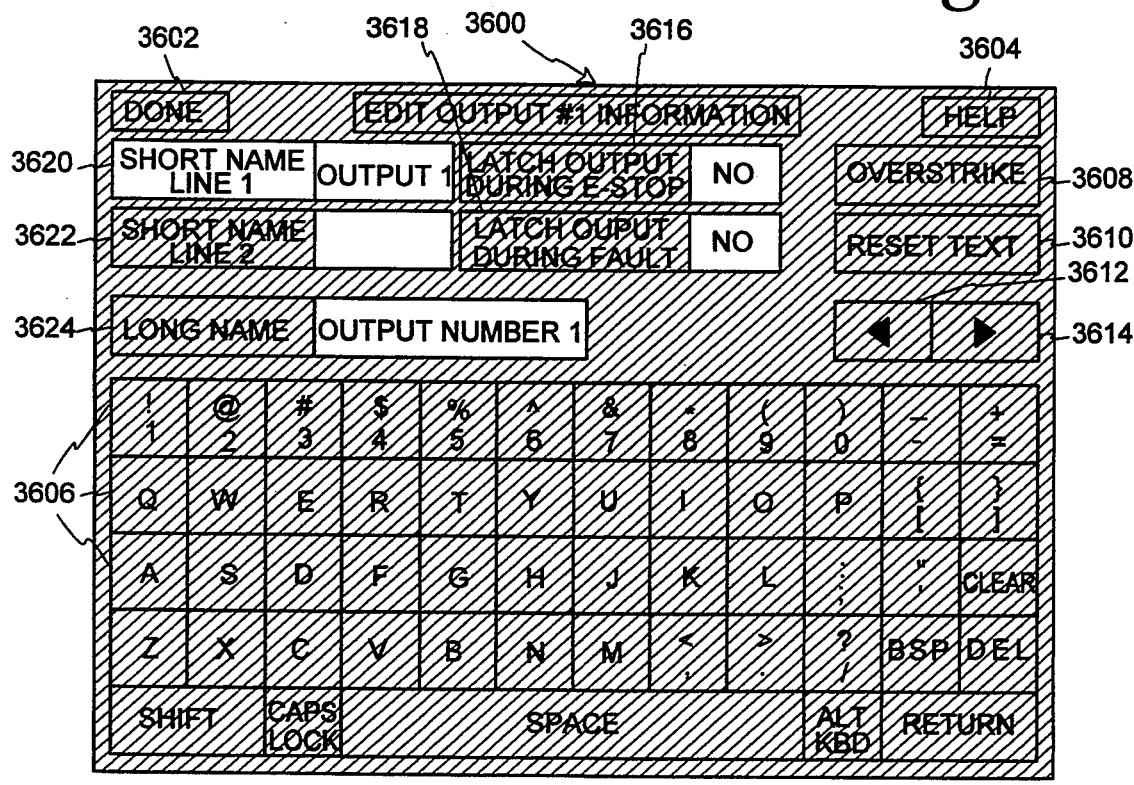
FIG. 36 is an "edit output" screen showing output one and allowing changes with a touch screen QWERTY keyboard.
Figure 37:
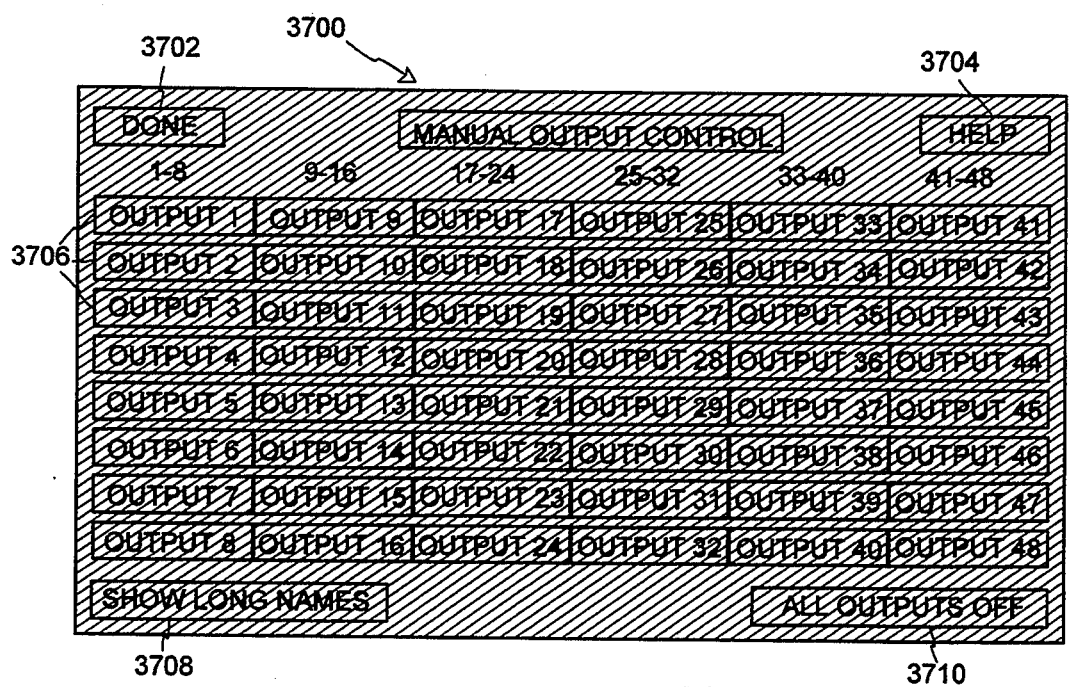
FIG. 37 is a "manual output control" screen.

Turning now to FIGS. 31, 32 and 33, input states are managed with the current input states screen 3100, select input to edit screen 3200, and edit input information screen 3300. In the current input states screen 3100, done and help are provided at 3102 and 3104. Since both long names and short names are stored in the data structure 798, the user may toggle between long names and short names on the display by depressing the show long names button 3106. As illustrated, the 48 input short names are shown. The user may toggle between input and output states by using the show output state button 3108. The select input to edit screen 3200 has done and help keys represented at 3202 an 3204.

Selection of inputs is performed by pressing pushbuttons 3208. Long names will be displayed upon depressing show long names pushbutton 3206. The edit input information screen 3300, as illustrated, shows the short name line 1 for input 1 being edited. As illustrated, the short name is broken down in to line 1 and line 2, and the long name is a long character string. User may edit the short name by depressing 3316 and the second line of the short name by depressing 3318. The long name may be edited at 3320. The user is completely at liberty to name the inputs for the SIMPLE controller 200. This is accomplished with a touch screen QWERTY keyboard indicated at 3306. Overstrikes are allowed by pushbutton 3308 and toggles to insert mode. Reset text is provided by button 3310, and arrow forward and arrow backwards are provided at 3312 and 3314, respectively.

Turning now to FIGS. 34, 35, 36, and 37, the output states are similarly selected and edited through various screens. The current output states screen is indicated generally at 3400. Done and help are indicated by buttons 3402 and 3404, respectively. Output states are selected at 3410. Long names appear upon depressing button 3406, and the user may toggle to show input states screen by pressing 3408. The select output to edit screen is shown generally at 3500. Done and help pushbuttons are indicated at 3502 and 3504, respectively.

The user may select an output with the buttons 3506. Long names will be shown by pressing the show long names button 3508. Edit output information screen is indicated generally 3600. Done and help buttons are indicated at 3602 and 3604, respectively. Short name line 1 is depressed at 3620. Short name line 2 is indicated at 3622. The long name button 3624 may be depressed to edit the long name. The QWERTY keyboard keys are indicated at 3606. Overstrike is indicated at 3608. Reset text is indicated at 3610. Backward arrow and forward arrow are indicated at 3612 and 3614, respectively.

Of particular interest on this screen is the latch output during E-stop button 3616 which instructs the SIMPLE controller 200 to latch or not to latch the output on an E-stop condition. Latch output during fault button 3618 similarly instructs the SIMPLE controller 200 to latch or not to latch the output once a fault occurs in an actuation of that output.

Manual control or setting and resetting of output signals are controlled through manual output control screen indicated generally at 3700. Done and help pushbuttons are indicated at 3702 and 3704, respectively. 48 output pushbuttons are indicated at 3706. Long names may display by depressing pushbutton 3708, and forcing all outputs independent of the actuation definition OFF may be done at pushbutton 3710.

Figure 38:
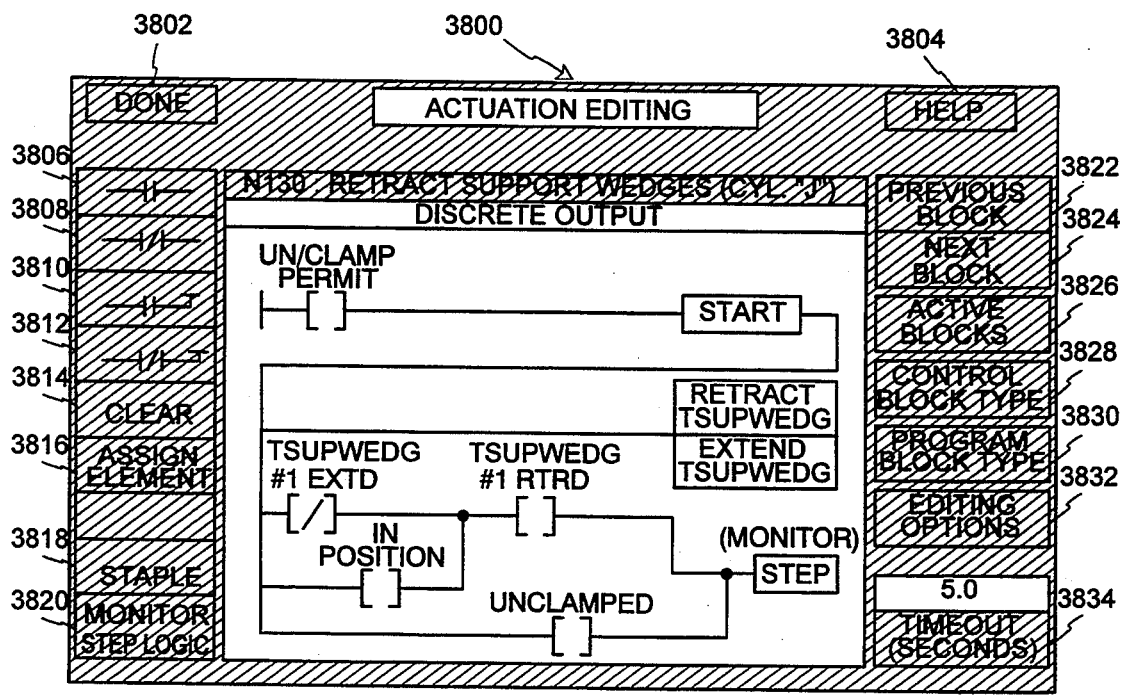
FIG. 38 is a "actuation editing" screen with a discrete output interlock definition shown.

FIG. 38 illustrates the screen entitled "Actuation Editing" screen, indicated generally at 3800. This screen provides the editing capabilities available on the SIMPLE controller 200. FIG. 38 displays the discrete output logic actuation as described in FIG. 15. Done and help pushbuttons are provided at 3802 and 3804, respectively. Programming of the interlocks is provided primarily by the touch screen pushbuttons located along the left-hand side of the screen. The open contact "AND" logic touch screen select is indicated at 3806. The closed contact "NAND" logic touch screen select is indicated at 3808. The open contact "OR" touch screen select is indicated at 3810. The closed contact "NOR" touch screen select is indicated at 3812. The user may clear a Boolean expression input by highlighting the particular expression and depressing the clear pushbutton 3814. The user assigns elements by depressing 3816. Staple may be indicated by pressing 3814. As shown in FIG. 38, the actuation 130 which is indicated is stapled to actuation 140 with the downward arrow.

Monitor end-state button 3820 allows the user to continuously monitor the end-state once the actuation is complete. The monitor end-state function actuation is ON in FIG. 38, as indicated by the words monitor in parenthesis at the end of the actuation. The actuation number and name is indicated in 3836.

The user may view the previous actuation by depressing button 3822. The next actuation is viewed by pressing 3824. All active actuations are viewed by pressing 3826. Depressing it again allows all actuations to be viewed, whether active or not. Control actuation types button 3828 allows the user to select from the control actuation types indicated in FIGS. 14 through 18. The program actuation type 3830 allows the user to select program actuations indicated in FIGS. 19 through 26. The screen indicated at FIG. 38 is the primary programming vehicle, and is provided at every work station 108 on the SIMPLE controller 200.

The ladder structure constructed as illustrated in the window of FIG. 38 illustrates the Boolean "ANDING" and "ORING" operations which are helpful in defining the interlocking. As illustrated, the Boolean conditions constructed before the step in FIG. 38 require: transfer support wedge #1 NOT extended OR in position AND transfer support wedge #1 retracted OR unclamped=- step. Various Boolean expressions such as those illustrated in FIG. 38 may be easily constructed with the touch screen push buttons 3806 through 3816.

Figure 16:
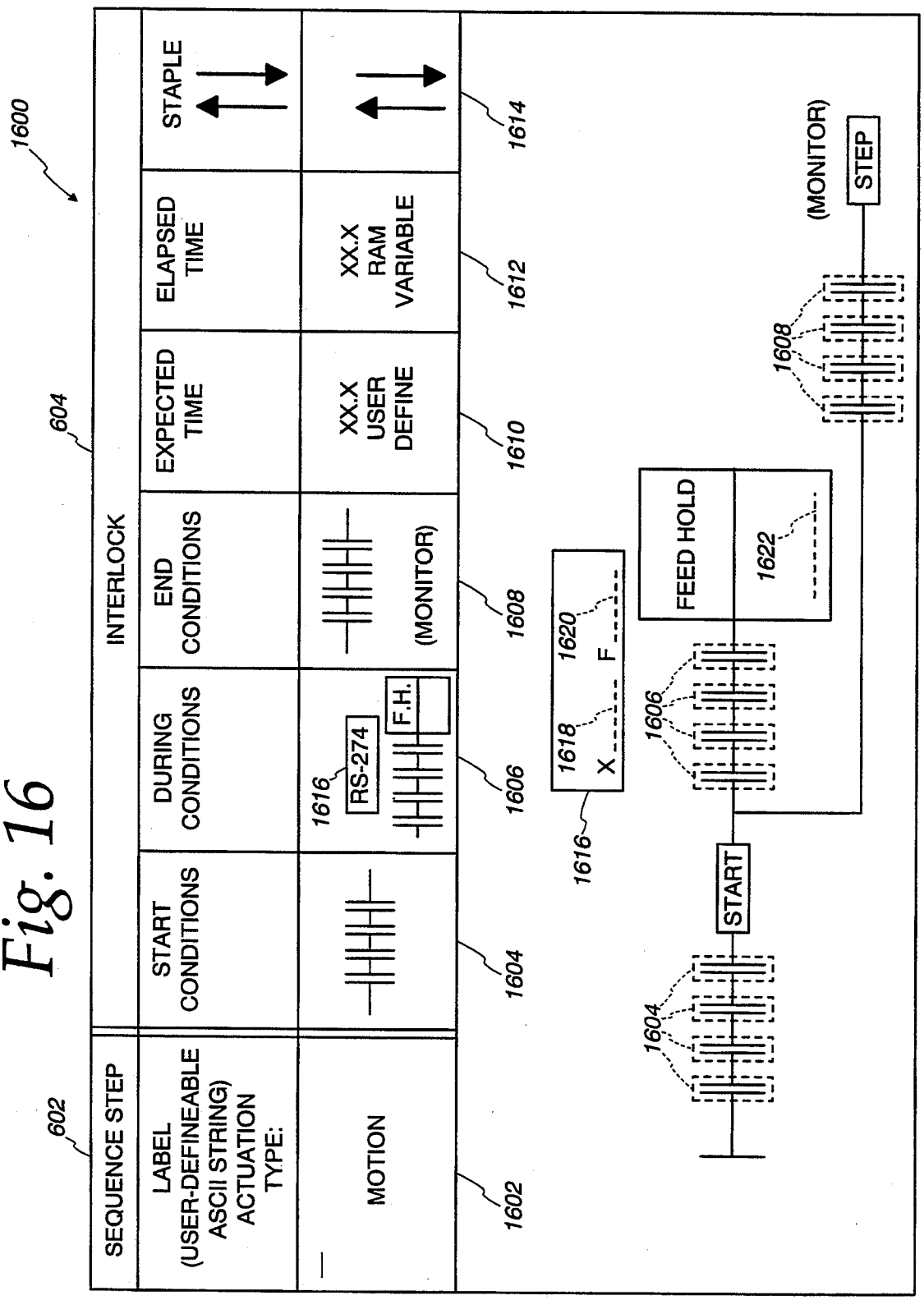
FIG. 16 is a table which illustrates the sequence and interlock details for the motion actuation illustrating the way in which the resulting data structure relates to program logic.
Figure 39:
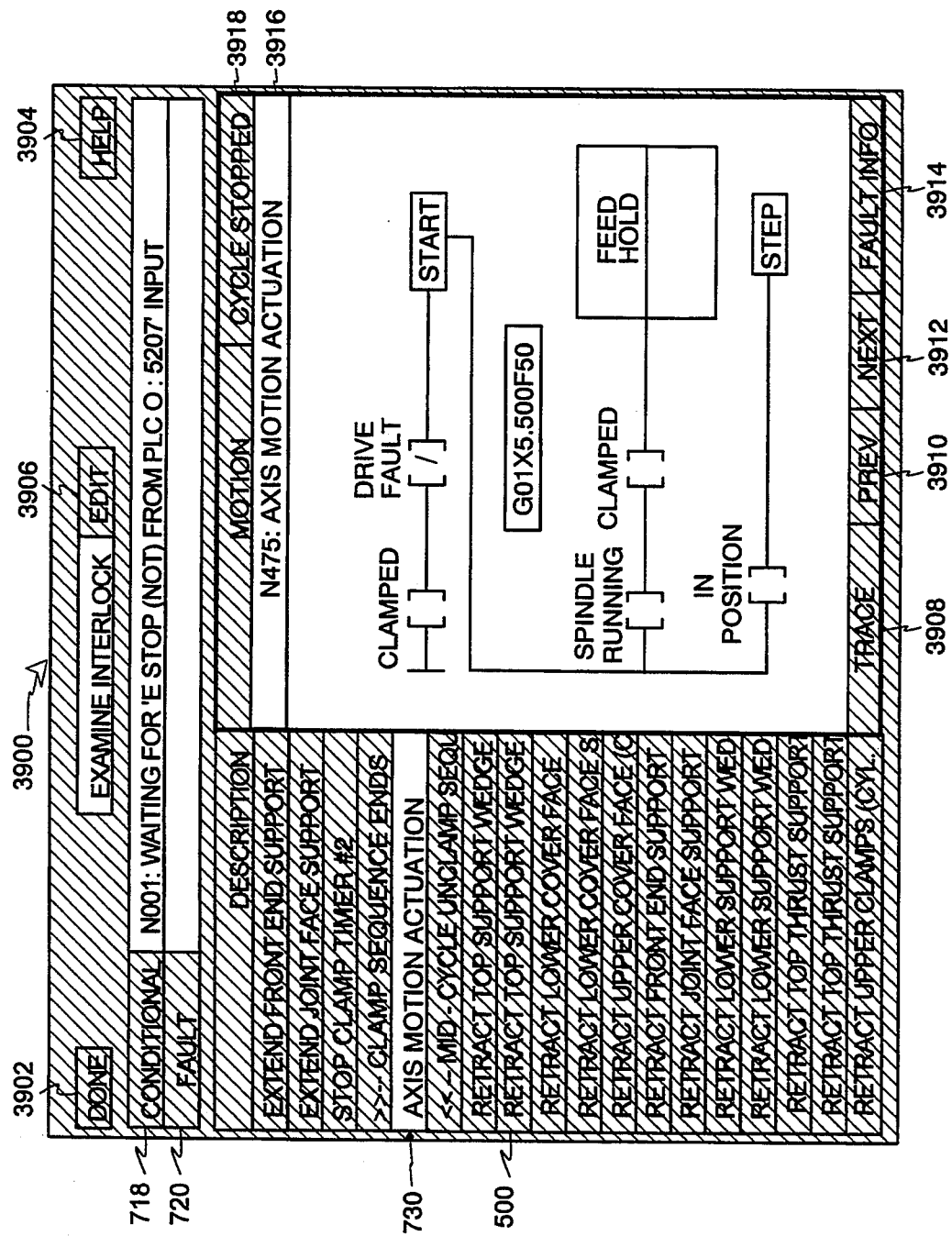
FIG. 39 is a display illustrating the "examine interlock" window which is revealing the details of an axis motion actuation.
Figure 40:
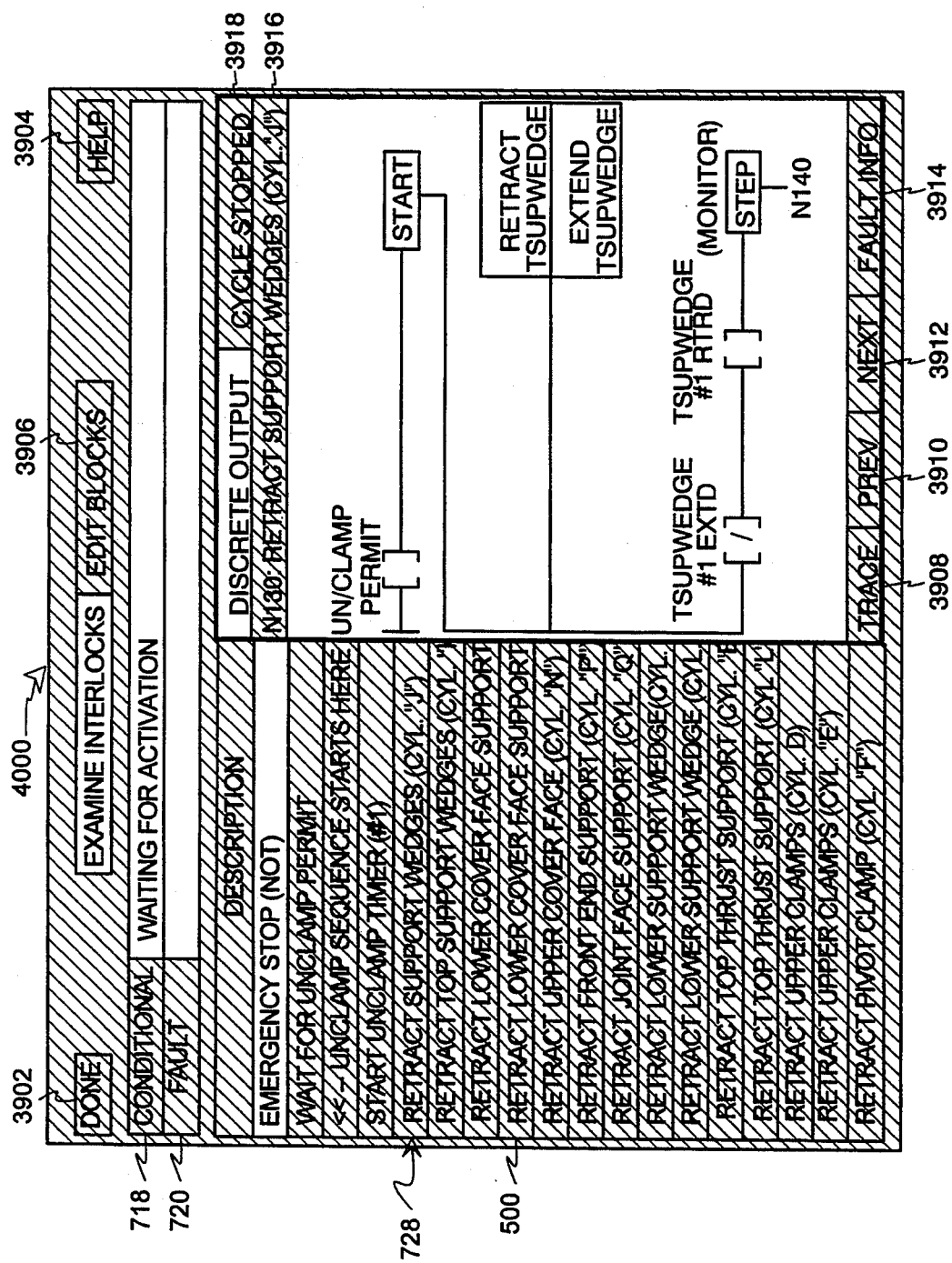
FIG. 40 is a display illustrating the "examine interlock" window which is revealing the details of a discrete output actuation for retracting support wedges at actuation number 130.

In FIG. 39, the examine interlocks screen 3900 is illustrated with a motion actuation selected, as was indicated in FIG. 16. The examine interlock screen 3900 is based upon the observation pointer 708. The user may trace the actuation pointer by depressing 3908 as the interlock window will update as each actuation is encountered. Previous actuation will be displayed by depressing 3910. Next actuation is displayed by depressing 3912. Fault information about a particular Boolean input is displayed by depressing 3914. The actuation type is displayed along with its actuation number at 3916 and controller mode status is displayed at 3918. Done and help pushbuttons for the examine interlocks screen are available at 3902 and 3904, respectively. In FIG. 40, the examine interlocks screen 4000 is illustrated showing a discrete output actuation.

Figure 41:
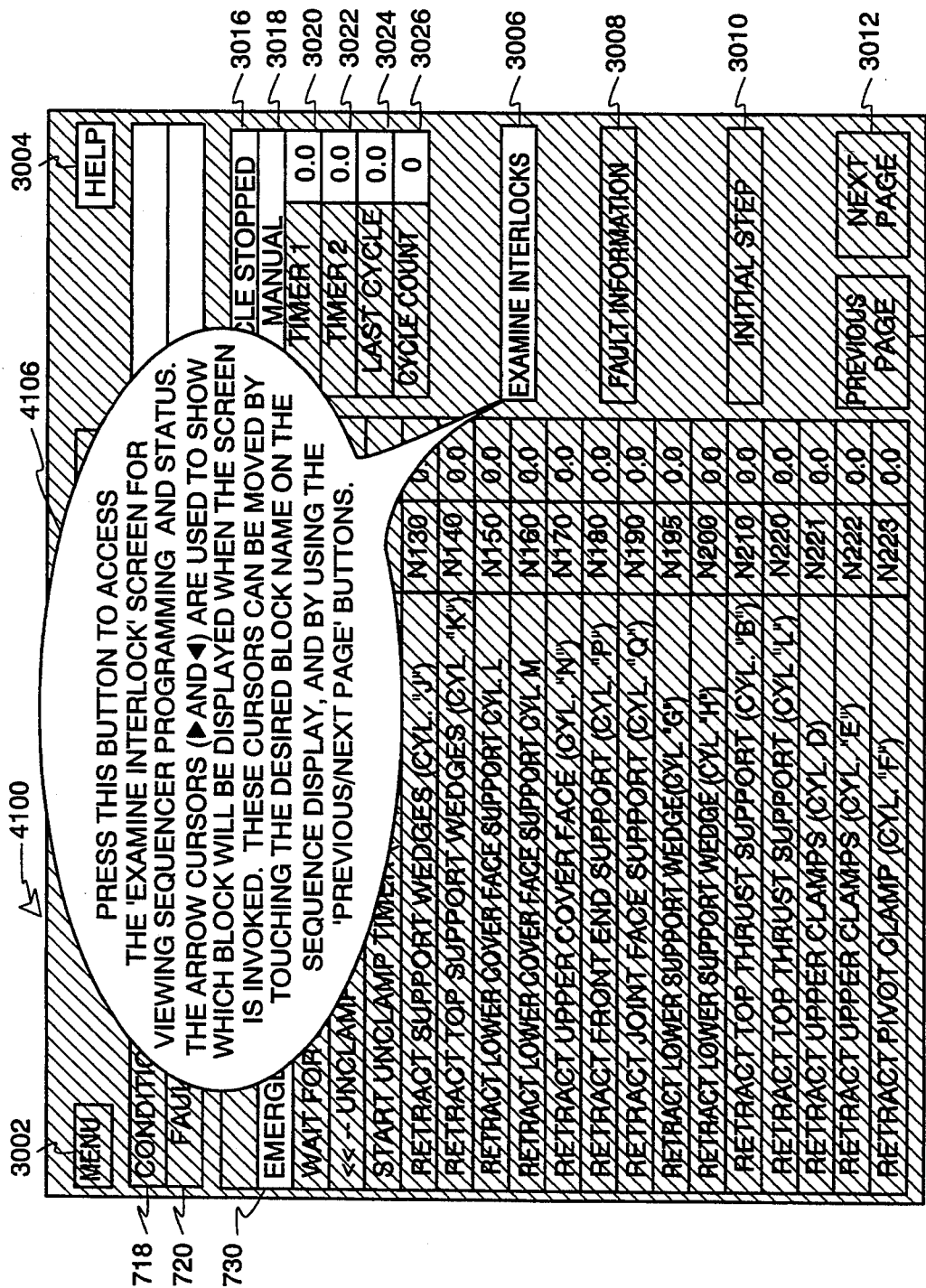
FIG. 41 is a "monitor sequence" display illustrating the help function wherein the examine interlock key is described.

Note FIG. 41 wherein the monitor sequence screen 4100 is illustrated showing the help touch screen button 3004 depressed, and the examine interlock button 3006 depressed to indicate the examine interlock function and a corresponding help coupled with informative text is provided from the help data file 784. Similar help messages are available throughout the program by pressing any help button and another button for help on the button.

The above-described screen displays which are driven by the SIMPLE controller program structure, shown in FIGS. 7A and 7B and described above, represent a very high-level functional programming scheme useful for controlling sequential operations and particularly those operations utilized in machining transfer lines. Such functional programming may be provided through the use of the various object oriented programming languages available today. Alternatively, off-the-shelf programs such as MATRIX LAYOUT or TOOL BOOK for an IBM compatible platform, or HYPERCARD/HYPERTALK for the Apple Macintosh platform, also provide means for such program designs. In the present invention, MATRIX LAYOUT was used in early versions and later an interpreter was designed with the C programming language by Delta Automation, Inc., Rogers, Ark. The most recent embodiment described herein is programmed entirely in C.

Turning now to FIGS. 42A, 42B, 42C, and 42D, a SIMPLE synchronizer and workstation inter-station communication command exchange is indicated generally at 4200. This example is intended to illustrate the way in which the SIMPLE technique enables flexibility for process definition and refinement. Furthermore, the example also illustrates that while the Boolean conditions utilized within the program control actuations resemble ladder logic, the programming according to the present invention is really far different from that of ladder logic. In accordance with the present invention, the program structure resembles that of ladder logic and thus makes it easy for users familiar with ladder logic to use the teachings of the present invention. However, the above-described Boolean conditions utilized by the interlock aspects of the present invention, do not correlate at all to relay contact settings, but rather they relate to data input and output bit conditions utilized within the interlock scheme of the present invention.

Moreover, it should be readily appreciated by one skilled in the art that the SIMPLE technique, in fact, addresses three vital factors which are important within a transfer line control scheme. These factors, (1) inherent diagnostics, (2) process orientation, and (3) integrated motion and sequence control, provide the user with an environment to educate himself as to machine operation from a single SIMPLE controller 200, located either at the synchronizer or at a station. The user may view a real-time animation of the activities of the process, thus providing a process apparent man-machine interface.

As illustrated generally at 4200, the actuations on the left-hand side represent the sequence of the synchronizer. These actuations may be carried out either locally or remotely at workstations. Local actuations include the four transfer commands, namely, (1) engage transfer, (2) disengage transfer, (3) advance transfer, and (4) return transfer, which are all executed by the synchronizer locally. Remote commands include: (1) clamp, (2) unclamp, and (3) cycle units, which are communicated to the various workstations and performed at those workstations.

As illustrated, the example starts with the synchronizer broadcasting an "unclamp" network command to all workstations. More particularly, UNCLAMP 4202 represents a discrete output actuation such as that shown in FIG. 15, the control being programmed particularly to broadcast the unclamp command from the synchronizer to the workstations. Details of the programming are illustrated at 4204. Boolean start conditions for the interlock are represented by two conditions at 4206. Boolean conditions 4206 ensure that the hydraulics are running and that parts are present. Once started 4208, the BROADCAST UNCLAMP output 4210 is activated, at which point the synchronizer waits for signal input indicating all parts unclamped as indicated by the Boolean end condition 4212.

START OF UNCLAMP sequence actuation 4216 at the workstation, similar to that shown in FIG. 14, is programmed particularly for this example. Inward pointing chevron 4215 indicates the place holder for the subsequence instruction from the synchronizer and is communicated from the synchronizer from the UNCLAMP 4202. Unclamp Boolean start condition 4220 represents network input initiated from 4210.

Figure 15:
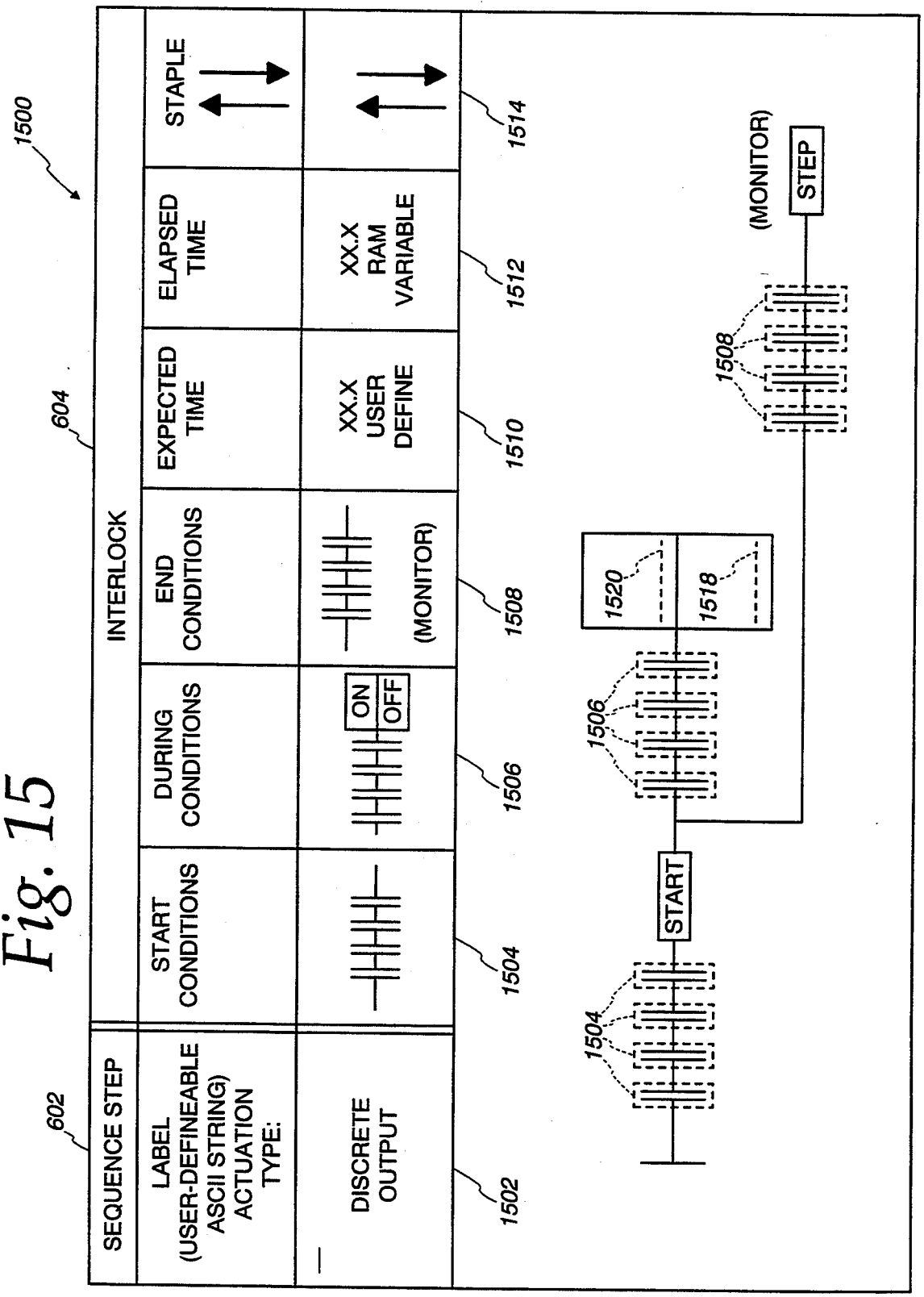
FIG. 15 is a table which illustrates the sequence and interlock details for the discrete output actuation illustrating the way in which the resulting data structure relates to program logic.

RETRACT CLAMP 4224 is programmed from a discrete output actuation as that shown in FIG. 15. Details of the programming structure are illustrated at 4225 and the structure therein is thus presented to the Solver 790 allowing the subsequence actuations to be executed as illustrated in the SIMPLE program structure shown in FIGS. 7A and 7B. Note particularly that in this case no Boolean start conditions have been programmed. Thus, START 4226 is immediate and EXTEND CLAMP SOLENOID OFF 4228 is executed and RETRACT CLAMP SOLENOID ON 4230 is executed. The OFF 4228 and the ON 4230 have incorporated a 9 millisecond delay between the actuation of the OFF and the ON. This is implemented within the program to deal with the practical aspects of the clamping operations and is transparent to the user. End Boolean conditions 4232 check for the clamp not being extended and for the clamp being retracted signifying successful completion.

Figure 17:
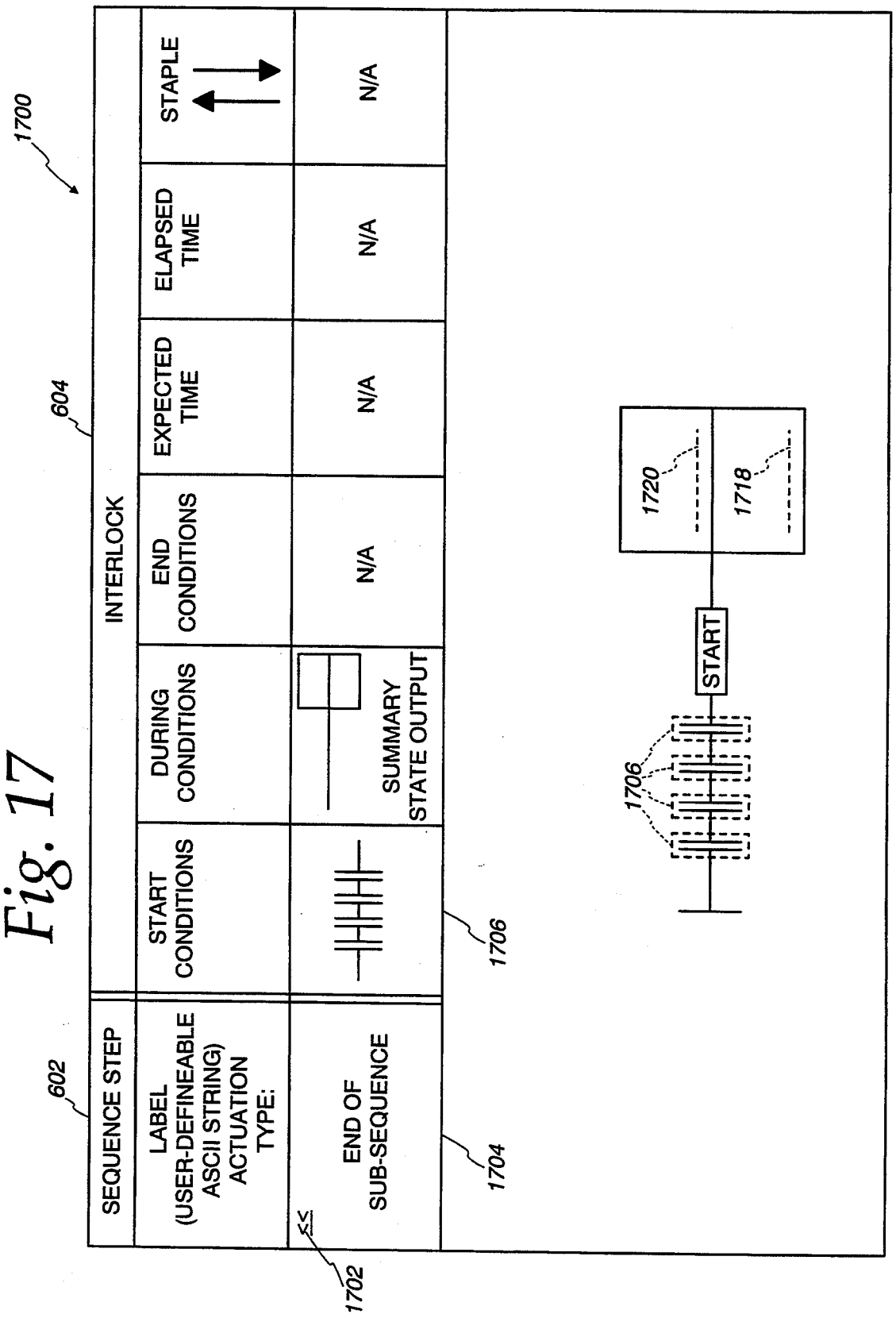
FIG. 17 is a table which illustrates the sequence and interlock details for the end of subsequence actuation illustrating the way in which the resulting data structure relapses to program logic.
Figure 27:
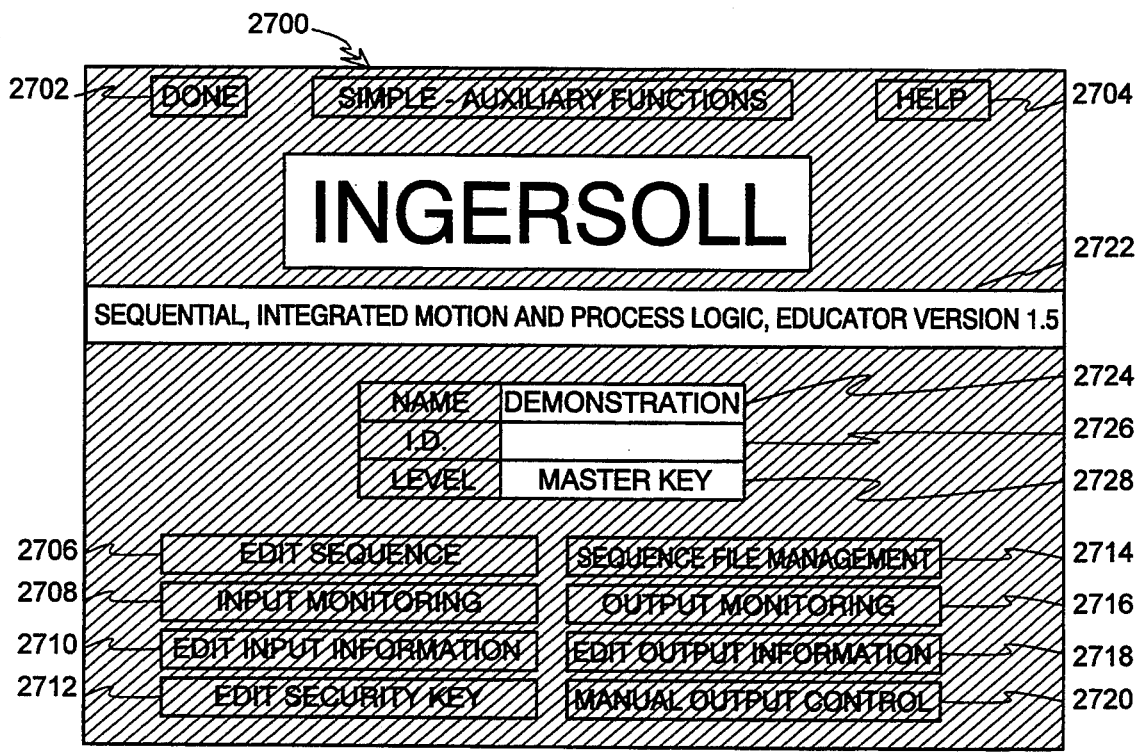
FIG. 27 is a touch screen display showing the SIMPLE "auxiliary portions" screen.

END OF UNCLAMP sequence 4236 is an end of subsequence actuation similar to that shown in FIG. 17. The outward pointing chevron 4235 represents a place holder for the response communicated from the workstation to the synchronizer. Program particulars are illustrated at 4238. Boolean start conditions 4240 ensure the clamp not being extended and ensure that the clamp is retracted. The end of subsequence outputs are set at 4244 and 4246, indicating that the particular station is unclamped, which is verified by the Boolean end condition 4212 as illustrated.

Next, the synchronizer performs the ENGAGE TRANSFER 4248 wherein particulars are illustrated at 4250. This program control actuation is motion control actuation as illustrated in FIG. 16. Boolean start conditions 4252 check that all station units are returned and that all parts are unclamped. START actuation 4254 allows the sequence to proceed having met the start conditions as defined by the interlock. During condition 4256 ensures that all workstation units are returned during the engage transfer actuation. MOTION COMMAND actuation 4258 sends a standard EIA-RS274 format Y=3000, F=300, to represent an ASCII sequence as a command to the motion control, here the transfer bar. "Y" represents the position coordinate, and "F" represents the feed rate as is well understood in the art. FEED HOLD 4260 is executed when the desired conditions are met. End condition 4262 tells the synchronizer that the transfer is engaged and END 4264 represents the end of the sequence, allowing the synchronizer to proceed to the next actuation.

ADVANCE TRANSFER 4266, as shown in more detail at 4268, is also a motion control actuation similar to that shown in FIG. 16. Start conditions 4270 ensure that all workstation units are returned, all fixtures are unclamped, and the transfer is engaged. All workstations should be returned during the advance transfer cycle and this condition is tested at during condition 4274. Motion control commands are sent to the CMC from MOTION COMMAND 4276 wherein X=24000 and F=300. FEED HOLD 4278 is executed if condition 4274 fails. End condition 4280 checks that the transfer is advanced and END is signified at 4282.

DISENGAGE TRANSFER 4284, also a motion control actuation performed locally at the synchronizer, is illustrated in more detail at 4286. Note that the DISENGAGE TRANSFER structure is actually quite similar to the ADVANCE TRANSFER structure as illustrated above. Start conditions 4288 ensure that all workstation units are returned, all fixtures are unclamped, and that the transfer is advanced. The start conditions for the interlock having been met, the START is acknowledged at 4290. The during condition 4292 ensures that all workstation units are returned. Feed hold is determined at 4296. If not, the MOTION COMMAND Y=3000, F=300, is sent at 4294. End condition 4298 ensures that the transfer was disengaged and end is sent at 4300.

Figure 42A:
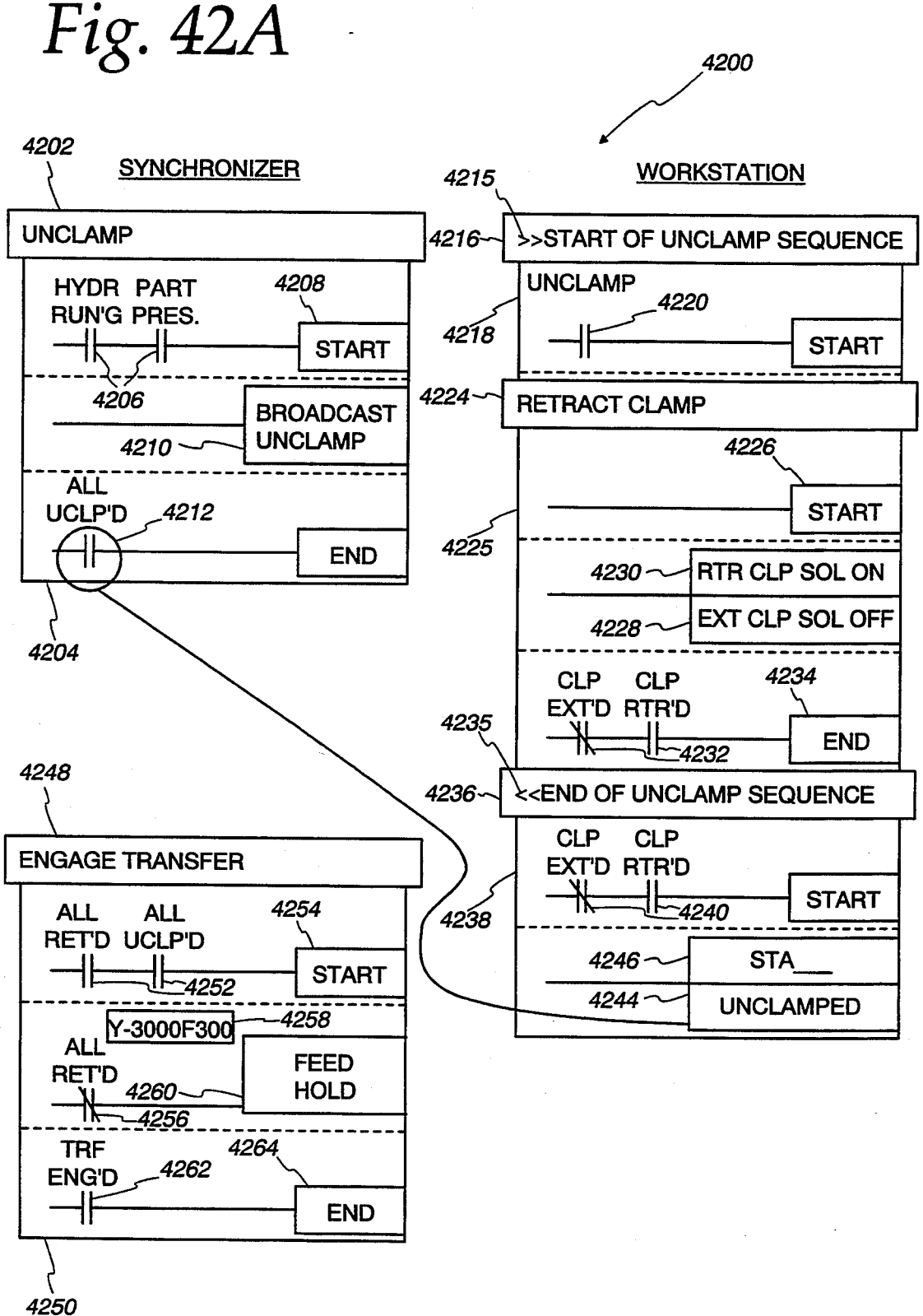
FIGS. 42A, 42B, 42C, and 42D present an example of an exchange between a synchronizer and a workstation illustrating the execution of a transfer machine process according to the present invention by revealing side-by-side the program flow of the synchronizer and of the workstation.
Figure 42B:
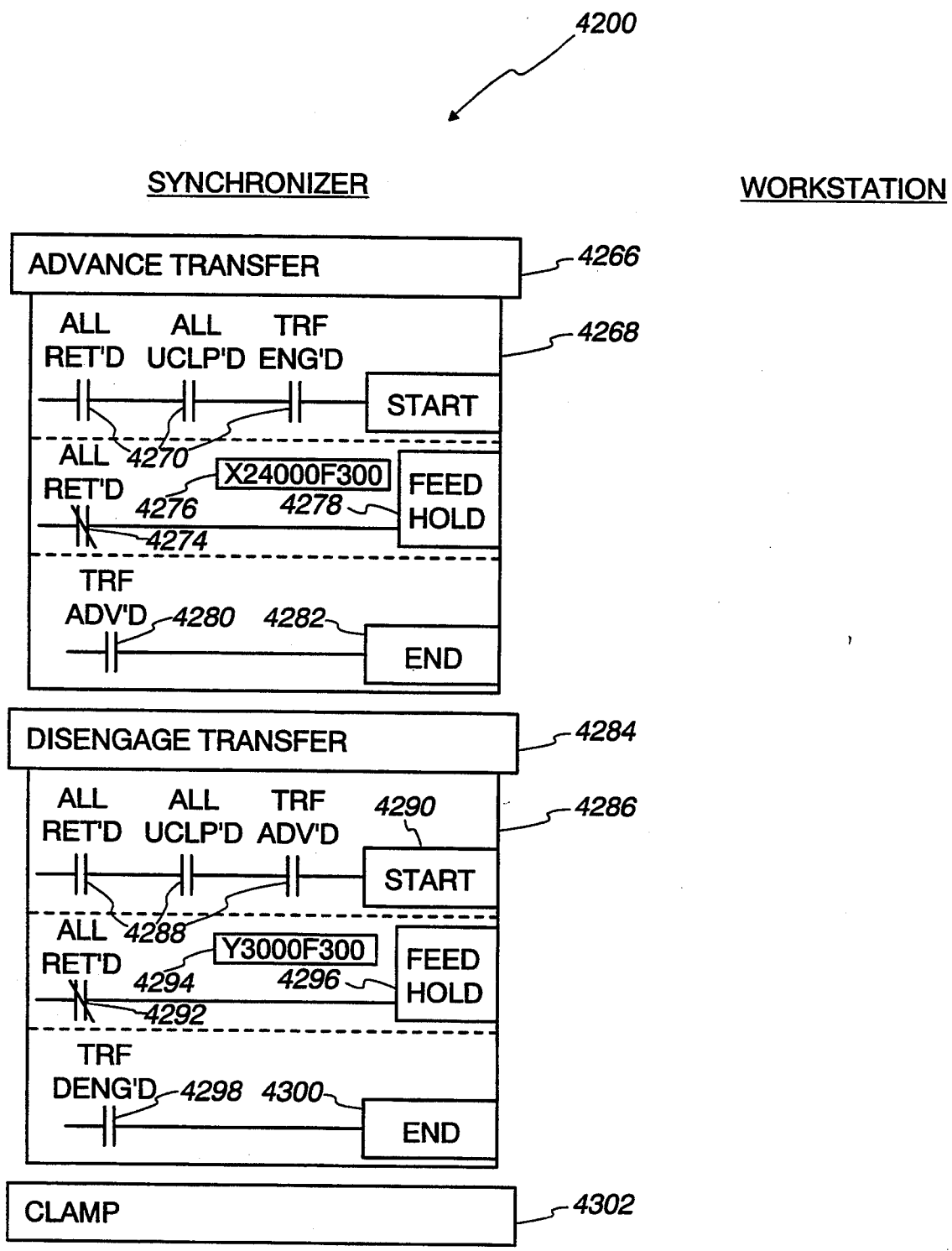
Figure 42C:
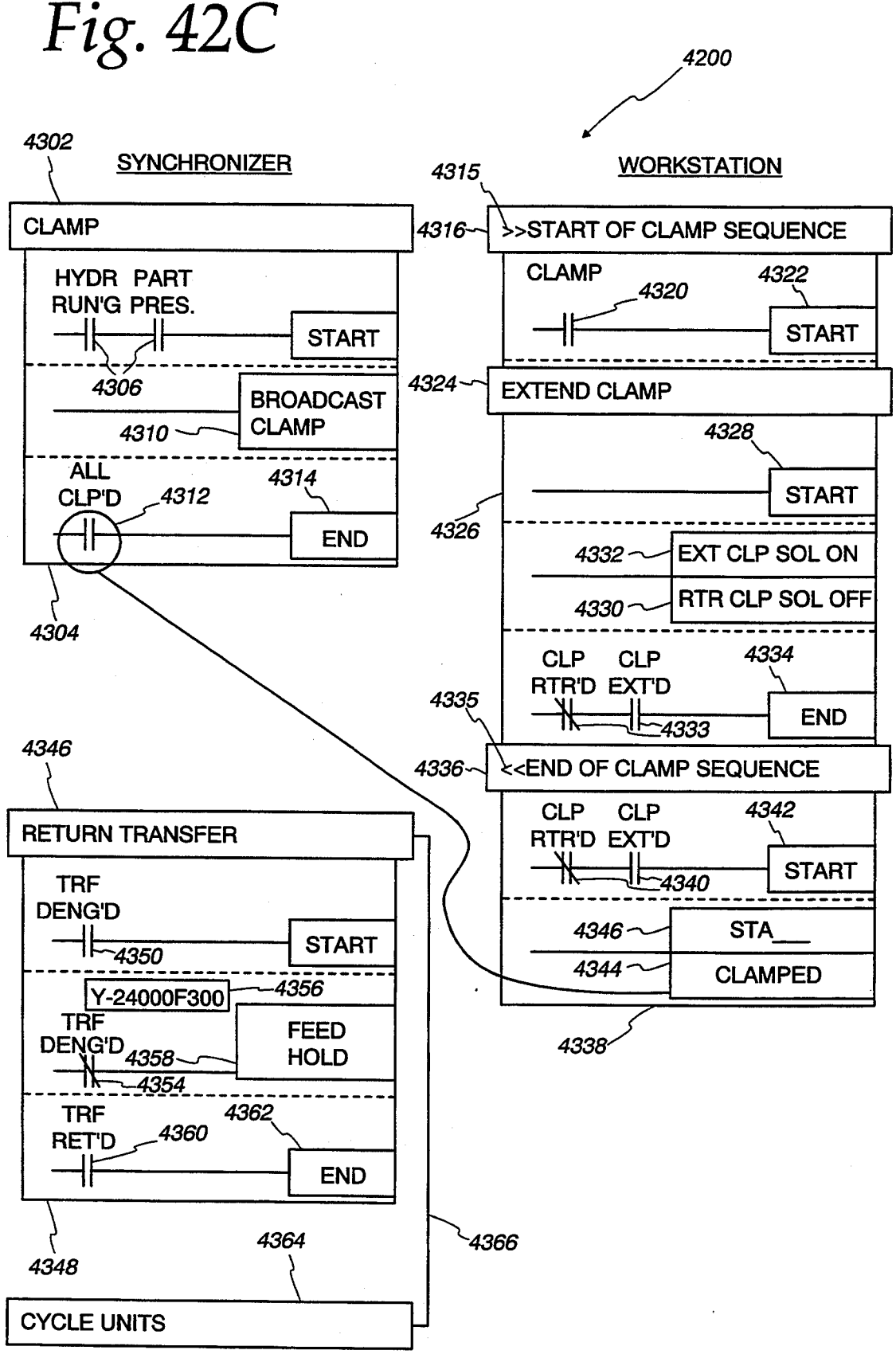

The synchronizer then executes a CLAMP at 4302, which is illustrated both in FIG. 42B and 42C. CLAMP 4302 is illustrated in more detail at 4304. Start conditions 4306 ensure that the hydraulics are running and the part is present. BROADCAST CLAMP 4310 is then sent as a command to all workstations for the clamp sequence. End condition 4312 ensures that all parts are clamped and END is executed at 4314.

The clamp actuation 4302 is executed remotely at the workstation as illustrated in FIG. 42C, wherein START OF CLAMP sequence 4316 is initiated by the inward pointing chevron 4315 sent from the synchronizer. Condition 4320 signifies the sequence starts from network input clamp 4310.

The next actuation, EXTEND CLAMP 4324, is then executed by the workstation. The sequence particulars are illustrated at 4326. There are no start conditions so this actuation proceeds to START at 4328. During the operation of the extend clamp actuation, retract clamp solenoid is turned off at 4330 and extend clamp solenoid is turned on at 4332. End conditions 4332 ensure that the clamp is not retracted and that the clamp is, in fact, extended. END is then executed at 4334. END OF CLAMP sequence 4336 then proceeds to send an indication 4346 and 4344 depicted as an outward pointing chevron symbol 4335 back to the synchronizer to signify the end of the subsequence, the particulars being illustrated at 4338. Start conditions 4340 ensure that the clamp is not retracted and that the clamp is extended. START is indicated at 4342, and 4344 and 4346 set network I/O data indicating that the particular station is clamped, which the synchronizer then discerns at end condition 4312 as illustrated.

Figure 42D:
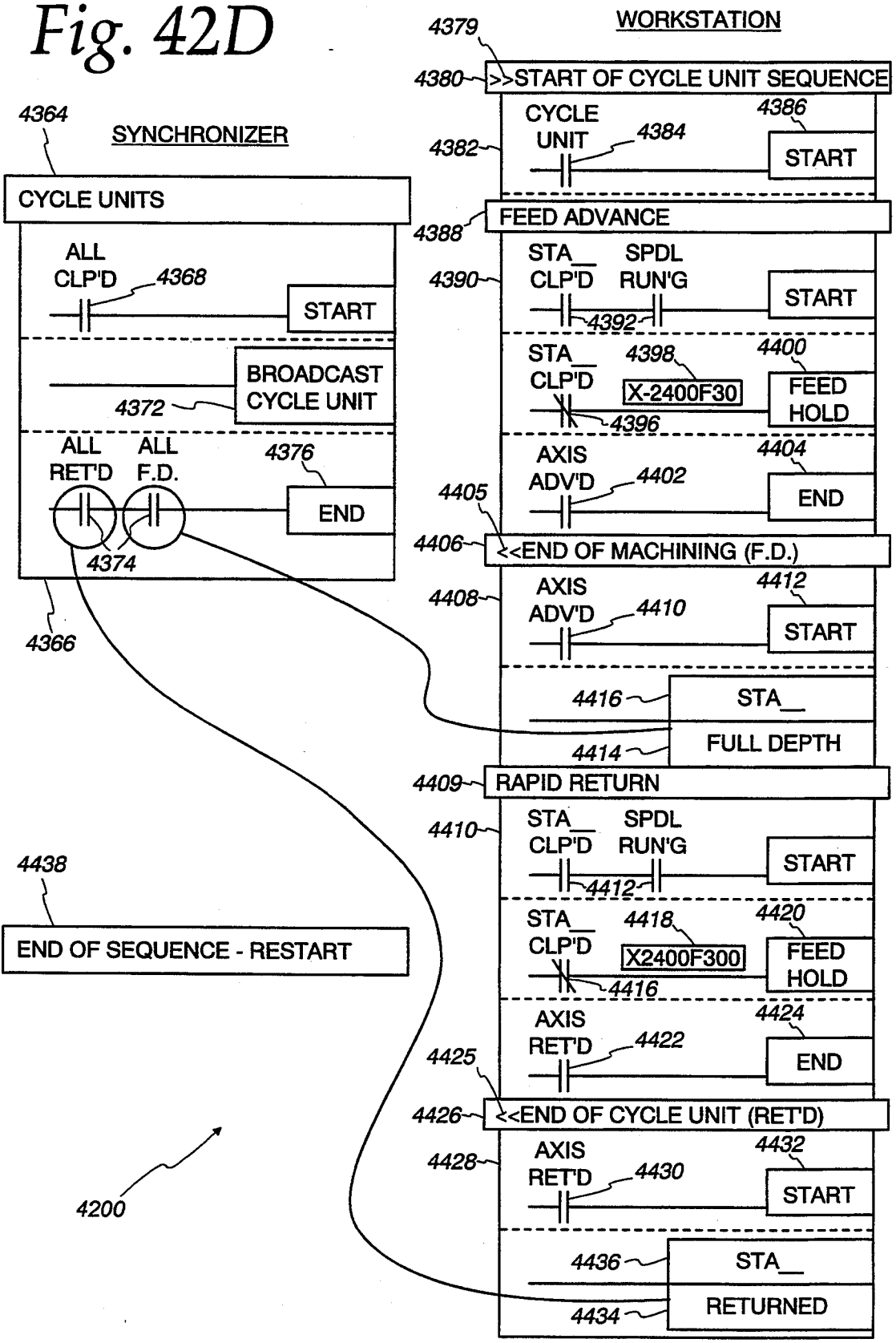

The synchronizer then proceeds to execute the RETURN TRANSFER 4346 and CYCLE UNITS 4364 commands simultaneously as indicated by their being "stapled" as indicated at 4366. The RETURN TRANSFER 4346 and the CYCLE UNITS 4364 are derived from motion actuations illustrated at FIG. 16 and FIG. 15, respectively. The staple is thus illustrated at 1614 and 1514. The particulars of the RETURN TRANSFER 4346 are illustrated at 4348. CYCLE UNITS 4364 are illustrated in FIG. 42C and 42D, the particulars of CYCLE UNITS 4364 are illustrated at 4366 in FIG. 42D.

When program actuations are stapled together, all start conditions, and end conditions must be met for all stapled actuations. Thus, in the present example, start conditions 4350 and 4368 must both be met ensuring that the transfer is disengaged and that all parts are clamped before either actuation will start. Solver 790 thus verifies all conditions concurrently during its processing of these actuations. During condition 4354 ensures that the transfer is disengaged during the return transfer actuation.

The MOTION COMMAND X=24000 and F=300 is sent at 4356. FEED HOLD is determined at 4358. End condition 4360 ensures that the transfer is returned and end is indicated at 4362. BROADCAST CYCLE UNIT is sent to all stations at 4372. End conditions 4374 check that all of the tooling utilized in cycling the units is returned and that all tooling achieve the appropriate full depth (F.D.). As illustrated, these end conditions are derived from inputs which are set at the workstations. See particularly drawing reference numerals 4414, 4416, 4434, and 4436, discussed further below.

Upon receiving the CYCLE UNITS command depicted by inward pointing chevron 4379 from the synchronizer, the workstation as illustrated begins the START OF CYCLE UNIT sequence 4380, which is shown in detail at 4382. Start condition 4384 is enabled by cycle unit network input 4372 and at 4386. Next, the actuation "Feed Advance" 4388, as illustrated at 4390, is a motion actuation causing the tool to be advanced into the part. Start conditions 4392 are used to indicate that the particular station is clamped and that the spindle is running. During condition 4396 checks for the station not clamped during the feed advance actuation. MOTION COMMAND 4398 sends X=2400, F=30 to the CMC located at the particular workstation, and feed hold is invoked as appropriate at 4400. End condition 4402 checks to verify that the axis was advanced and end is indicated at 4404, allowing the workstation to proceed to the next actuation.

END OF MACHINING 4406 herein represents that the machining has reached its full depth (F.D.), thus a network signal depicted as an outward pointing chevron 4405 is communicated back to the synchronizer, indicating the end of machining. At 4408, start condition 4410 indicates that the axis was advanced and START is invoked at 4412. The particular network signal indicated at 4414 and 4416, which the synchronizer utilizes as data input in determining end condition interlocks for the CYCLE UNITS 4364 at the synchronizer.

The RAPID RETURN 4408 actuation is then performed at the workstation to return the machine tooling to its starting position. As illustrated at 4410, start conditions 4412 check that the particular station is clamped and that its spindle is running. During condition 4416 then checks for the particular station being clamped, the tooling is returned through a MOTION COMMAND 4418 sending the ASCII string X=4200, F=300 to the CMC at the workstation. Otherwise the feed hold 4420 is then invoked. End condition 4422 verifies that the axis is returned and end is indicated at 4424.

Next, the END OF CYCLE UNIT (RETURNED) 4426 is executed at the workstation and communicated to the synchronizer depicted via the outward pointing chevron 4425. Actuation details are illustrated at 4428. Start condition 4430 checks for the axis being returned and start is initiated at 4432. Data outputs indicated at 4434 and 4436 indicate that the particular station is, in fact, returned. As illustrated, this data is communicated back to the synchronizer via end condition 4374, indicating all returned within the CYCLE UNITS 4364.

After return transfer and cycle units have been completed at the workstation, the synchronizer then proceeds to END OF SEQUENCE-RESTART 4438, thus causing the synchronizer to resume execution at the beginning, namely, UNCLAMP 4202, and then the above-described cycle repeats itself. In the alternative, at the end of the synchronizer sequence, the synchronizer could be programmed to wait for user activation as illustrated by the END OF SEQUENCE WAIT FOR ACTIVATION 2002 as in FIG. 20.

The above-described sample, as illustrated in FIGS. 42A, 42B, 42C, and 42D, is a basic example showing a typical exchange between synchronizer and workstation. In particular, the example illustrated the synchronizer's seven major states. The example also illustrates the handshaking and other interaction between the synchronizer and the workstations, and the way in which the Boolean conditions which act as interlocks enhance the integrity of the sequential programming actuations which are executed by a SIMPLE controller 200.

While there has been described the preferred embodiments of the present invention, numerous modifications and changes will naturally be apparent to those skilled in the art. It is therefore intended by the appended claims to define all such modifications and changes as fall within the true spirit and scope of the invention.

What is claimed is:

1. A computer system for controlling an industrial process comprising:
   a data storage area; and
   a digital computer connecting to said data storage area and having input and output means for communicating with said industrial process and with an operator and programmed to form the following data storage allocation means for allocating space within said data storage area for the storage of blocks of data forming actuations each defining an industrial operation and comprising an interlock defining the operation's onset, an interlock defining the operation's continuation, and an interlock defining the operation's completion, and at least some of said actuations also comprising linkages to other actuations which linkages define executable sequences of actuations,
   solver means having access to said storage area for executing the operations called for by said actuations either in automatic sequence in accordance with said linkages or in response to manual requests from the operator,
   a background monitor having access to said storage area and called upon by said solver at appropriate times to process said interlocks, notifying said solver and, in at least some cases, giving forth an alarm indication when there is a change in the state of any monitored interlocks, and
   operator viewport control means for enabling an operator to view the sequences of actuations, said operator viewport control means comprising a manual mode which permits an operator to view and select and call for the execution of any actuation, subject to interlock control.

2. A computer system in accordance with claim 1 wherein said solver automatically initiates the monitoring of the completion interlocks of at least some actuations following the completion of the operation called for by the actuations, as defined by the completion interlocks, giving forth an alarm indication if the interlock state changes, until a subsequent actuation cancels this ongoing monitoring function.

3. A computer system in accordance with claim 1 in which said data storage allocation means further defines sequences of actuations to be subsequences having associated therewith a subsequence monitoring interlock formed from a programmable linkage of one or more of said completion interlocks of the actuations in each subsequence to form a subsequence completion interlock, and in which said background monitor is further called upon by said solver, when any given subsequence has run to completion, to give forth an alarm indication when there is a change in the state of the subsequence's linkage of completion interlocks.

4. A computer system in accordance with claims 1, 2 or 3 wherein said operator viewport control means enables an operator to view, in an animated fashion, the sequences of actuations and the interlock details and process details of any actuation being executed automatically and in sequence.

5. A computer system in accordance with claim 1 wherein said solver monitors the completion times of at least some actuations.

6. A computer system in accordance with claim 1 wherein said alarms pertain directly to the safe operation of the industrial process subject to control by the computer system.

7. A computer system for controlling an industrial process comprising:
   a data storage area; and
   a digital computer connecting to said data storage area and having input and output means for communicating with said industrial process and with an operator and programmed to form the following data storage allocation means for allocating space within said data storage area for the storage of blocks of data forming actuations each defining an industrial operation and comprising an interlock defining the operation's onset, an interlock defining the operation's continuation, and an interlock defining the operation's completion, and at least some of said actuations also comprising linkages to other actuations which linkages define executable sequences of actuations, solver means having access to said storage area for executing the operations called for by said actuations either in automatic sequence in accordance with said linkages or in response to manual requests from the operator, and a background monitor having access to said storage area and called upon by said solver at appropriate times to process said interlocks, notifying said solver and, in at least some cases, giving forth an alarm indication when there is a change in the state of any monitored interlocks, said data storage allocation means further defines sequences of actuations to be subsequences having associated therewith a subsequence monitoring interlock formed from a programmable linkage of one or more of said completion interlocks of the actuations in each subsequence to form a subsequence completion interlock, and in which said background monitor is further called upon by said solver, when any given subsequence has run to completion, to give forth an alarm indication when there is a change in the state of the subsequence's linkage of completion interlocks, said solver automatically monitors the completion interlocks of at least some actuations, in addition to said subsequences, following the completion of the operation called for by the actuations, as defined by the completion interlocks, and gives forth an alarm indication if any such completion interlock state changes, until a subsequent actuation cancels one or more of these ongoing completion monitoring functions.

8. A computer system for controlling an industrial process comprising:

a data storage area; and a digital computer connecting to said data storage area and having input and output means for communicating with said industrial process and with an operator and programmed to form the following data storage allocation means for allocating space within said data storage area for the storage of blocks of data forming actuations each defining an industrial operation and comprising an interlock defining the operation's onset, an interlock defining the operation's continuation, and an interlock defining the operation's completion, and at least some of said actuations also comprising linkages to other actuations which linkages define executable sequences of actuations, solver means having access to said storage area for executing the operations called for by said actuations either in automatic sequence in accordance with said linkages or in response to manual requests from the operator, a background monitor having access to said storage area and called upon by said solver at appropriate times to process said interlocks, notifying said solver and, in at least some cases, giving forth an alarm indication when there is a change in the state of any monitored interlocks, said data storage allocation means further defines sequences of actuations to be subsequences having associated therewith a subsequence monitoring interlock formed from a programmable linkage of one or more of said completion interlocks of the actuations in each subsequence to form a subsequence completion interlock, and in which said background monitor is further called upon by said solver, when any given subsequence has run to completion, to give forth an alarm indication when there is a change in the state of the subsequence's linkage of completion interlocks, said solver automatically monitors the completion interlocks of at least some actuations, in addition to said subsequences, following the completion of the operation called for by the actuations, as defined by the completion interlocks, and gives forth an alarm indication if any such completion interlock state changes, until a subsequent actuation cancels one or more of these ongoing completion monitoring functions, and operator viewport control means for enabling an operator to view, in an animated fashion, the sequences of actuations and the interlock details and process details of any actuation being executed automatically and in sequence, said operator viewport control comprises a manual mode which permits an operator to view and select and call for the execution of any actuation, subject to interlock control.

9. A computer system in accordance with claim 6 wherein said operator viewport control comprises an edit mode and connects to application editing means which enable an operator having proper authorization to view and to edit said actuations.

10. A computer system in accordance with claim 8 wherein said manual mode further permits an operator to call for the random execution of any actuation, subject to interlock control.

11. A computer system in accordance with claim 8 wherein said operator viewport control comprises self documenting means for documenting the current configuration and status of the industrial process subject to control by the computer system.

12. A computer system for controlling at least one of a plurality of networked transfer line control computers including a plurality of workstation computers for controlling machine tools and a synchronizer computer for controlling the transfer line part movement and said workstation computers together comprising a machine transfer line control system, each computer comprising:

a data storage area; and a digital computer connecting to said data storage area and having input and output means for communicating with said transfer line control system and with an operator and programmed to form the following data storage allocation means for allocating space within said data storage area for the storage of blocks of data forming actuations each defining a transfer line operation and comprising an interlock defining the operation's onset, an interlock defining the operation's continuation, and an interlock defining the operation's completion, and at least some of said actuations also comprising linkages to other actuations which linkages define executable sequences of actuations, solver means having access to said storage area for executing the operations called for by said actuations either in automatic sequence in accordance with said linkages or in response to manual requests from the operator, a background monitor having access to said storage area and called upon by said solver at appropriate times to process said interlocks, notifying said solver and, in at least some cases, giving forth an alarm indication when there is a change in the state of any monitored interlocks, and operator viewport control means for enabling an operator to view the sequences of actuations, said operator viewport control means comprising a manual mode which permits an operator to view and select and call for the execution of any actuation, subject to interlock control.

13. A computer system in accordance with claim 12 wherein said solver automatically initiates the monitoring of the completion interlocks of at least some actuations following the completion of the operation called for by the actuations, as defined by the completion interlocks, giving forth an alarm indication if the interlock state changes, until a subsequent actuation cancels this ongoing monitoring function.

14. A computer system in accordance with claim 12 in which said data storage allocation means further defines sequences of actuations to be subsequences having associated therewith a subsequence monitoring interlock formed from a programmable linkage of one or more of said completion interlocks of the actuations in each subsequence to form a subsequence completion interlock, and in which said background monitor is further called upon by said solver, when any given subsequence has run to completion, to give forth an alarm indication when there is a change in the state of the subsequence's linkage of completion interlocks.

15. A computer system in accordance with claims 12, 13 or 14 wherein said operator viewport control means enables an operator to view, in an animated fashion, the sequences of actuations and the interlock details and process details of any actuation being executed automatically and in sequence.

16. A computer system in accordance with claim 12 wherein said solver monitors the completion times of at least some actuations.

17. A computer system in accordance with claim 12 wherein said alarms pertain directly to the safe operation of the transfer line subject to control by the computer system.

18. A computer system for controlling at least one of a plurality of networked transfer line control computers including a plurality of workstation computers for controlling machine tools and a synchronizer computer for controlling the transfer line part movement and said workstation computers together comprising a machine transfer line control system, each computer comprising:

a data storage area; and a digital computer connecting to said data storage area and having input and output means for communicating with said transfer line control system and with an operator and programmed to form the following data storage allocation means for allocating space within said data storage area for the storage of blocks of data forming actuations each defining a transfer line operation and comprising an interlock defining the operation's onset, an interlock defining the operation's continuation, and an interlock defining the operation's completion, and at least some of said actuations also comprising linkages to other actuations which linkages define executable sequences of actuations, solver means having access to said storage area for executing the operations called for by said actuations either in automatic sequence in accordance with said linkages or in response to manual requests from the operator, and a background monitor having access to said storage area and called upon by said solver at appropriate times to process said interlocks, notifying said solver and, in at least some cases, giving forth an alarm indication when there is a change in the state of any monitored interlocks, said data storage allocation means further defines sequences of actuations to be subsequences having associated therewith a subsequence monitoring interlock formed from a programmable linkage of one or more of said completion interlocks of the actuations in each subsequence to form a subsequence completion interlock, and in which said background monitor is further called upon by said solver, when any given subsequence has run to completion, to give forth an alarm indication when there is a change in the state of the subsequence's linkage of completion interlocks, said solver automatically monitors the completion interlocks of at least some actuations, in addition to said subsequences, following the completion of the operation called for by the actuations, as defined by the completion interlocks, and gives forth an alarm indication if any such completion interlock state changes, until a subsequent actuation cancels one or more of these ongoing completion monitoring functions.

19. A computer system for controlling at least one of a plurality of networked transfer line control computers including a plurality of workstation computers for controlling machine tools and a synchronizer computer for controlling the transfer line part movement and said workstation computers together comprising a machine transfer line control system, each computer comprising:

a data storage area; and a digital computer connecting to said data storage area and having input and output means for communicating with said transfer line control system and with an operator and programmed to form the following data storage allocation means for allocating space within said data storage area for the storage of blocks of data forming actuations each defining a transfer line operation and comprising an interlock defining the operation's onset, an interlock defining the operation's continuation, and an interlock defining the operation's completion, and at least some of said actuations also comprising linkages to other actuations which linkages define executable sequences of actuations, solver means having access to said storage area for executing the operations called for by said actuations either in automatic sequence in accordance with said linkages or in response to manual requests from the operator, a background monitor having access to said storage area and called upon by said solver at appropriate times to process said interlocks, notifying said solver and, in at least some cases, giving forth an alarm indication when there is a change in the state of any monitored interlocks, said data storage allocation means further defines sequences of actuations to be subsequences having associated therewith a subsequence monitoring interlock formed from a programmable linkage of one or more of said completion interlocks of the actuations in each subsequence to form a subsequence completion interlock, and in which said background monitor is further called upon by said solver, when any given subsequence has run to completion, to give forth an alarm indication when there is a change in the state of the subsequence's linkage of completion interlocks, said solver automatically monitors the completion interlocks of at least some actuations, in addition to said subsequences, following the completion of the operation called for by the actuations, as defined by the completion interlocks, and gives forth an alarm indication if any such completion interlock state changes, until a subsequent actuation cancels one or more of these ongoing completion monitoring functions, and operator viewport control means for enabling an operator to view, in an animated fashion, the sequences of actuations and the interlock details and process details of any actuation being executed automatically and in sequence, said operator viewport control comprises a manual mode which permits an operator to view and select and call for the execution of any actuation, subject to interlock control.

20. A computer system in accordance with claim 19 wherein said operator viewport control comprises an edit mode and connects to application editing means which enable an operator having proper authorization to view and to edit said actuations.

21. A computer system in accordance with claim 19 wherein said manual mode further permits an operator to call for the random execution of any actuation, subject to interlock control.

22. A computer system in accordance with claim 19 wherein said operator viewport control comprises self documenting means for documenting the current configuration and status of the transfer line subject to control by the computer system.

23. A method for controlling a transfer line comprising the steps of:

storing actuations defining a transfer line operation, an interlock defining the operation's onset, an interlock defining the operation's continuation, and an interlock defining the operation's completion;

establishing linkages between at least some of said actuations and other of said actuations, which linkages define executable sequences of actuations;

communicating input and output status information relating to the transfer line and said actuations to a human operator;

executing the operations called for by said actuations either in automatic sequence in accordance with said linkages or in response to manual requests from the operator;

monitoring the interlocks defined by said actuations when processed by said execution step at appropriate times and, in at least some cases, giving forth an alarm indication when there is a change in the state of any monitored interlock; and permitting the human operator with a manual mode of operation to view and select and call for the execution of any actuation, subject to interlock control.

24. A method in accordance with claim 23 wherein said execution step automatically initiates the monitoring of the completion interlocks of at least some actuations following the completion of the operation called for by the actuations, as defined by the completion interlocks, giving forth an alarm indication if the interlock state changes, until a subsequent executed operation defined by another actuation cancels this ongoing monitoring function.

25. A method in accordance with claim 23 in which said step for storing actuations further defines sequences of actuations to be subsequences having associated therewith a subsequence monitoring interlock formed from a programmable linkage of one or more of said completion interlocks of the actuations in each subsequence to form a subsequence completion interlock, and in which said background monitoring step is further called upon by said execution step, when any given subsequence has been fully executed, to give forth an alarm indication when there is a change in the state of the subsequence's linkage of completion interlocks.

26. A method in accordance with claims 23, 24 or 25 further comprising the step of displaying to the human operator, in an animated fashion, the sequences of actuations and the interlock details and process details of any actuation while the operation defined by the actuation is executed automatically and in sequence.

27. A method for controlling a transfer line comprising the steps of:

storing actuations defining a transfer line operation, an interlock defining the operation's onset, an interlock defining the operation's continuation, and an interlock defining the operation's completion;

establishing linkages between at least some of said actuations and other of said actuations, which linkages define executable sequences of actuations;

communicating input and output status information relating to the transfer line and said actuations to a human operator;

executing the operations called for by said actuations either in automatic sequence in accordance with said linkages or in response to manual requests from the operator;

monitoring the interlocks defined by said actuations when processed by said execution step at appropriate times and, in at least some cases, giving forth an alarm indication when there is a change in the state of any monitored interlock;

said step for storing actuations further defines sequences of actuations to be subsequences having associated therewith a subsequence monitoring interlock formed from a programmable linkage of one or more of said completion interlocks of the actuations in each subsequence to form a subsequence completion interlock, and in which said background monitoring step if further called upon by said execution step, when any given subsequence has been fully executed, to give forth an alarm indication when there is a change in the state of the subsequence's linkage of completion interlocks; and displaying to the human operator, in an animated fashion, the sequences of actuations and the interlock details and process details of any actuation while the operation defined by the actuation is executed automatically and in sequence;

said execution step automatically initiates monitoring the completion interlocks of at least some actuations, in addition to said subsequences, following the completion of the operation called for by the actuations, as defined by the completion interlocks, and gives forth an alarm indication if any such completion interlock state changes, until a subsequent actuation defines an operation that cancels one or more of these ongoing completion monitoring functions.

28. A method in accordance with claim 27 wherein said execution step monitors the completion times of at least some actuations.

29. A method in accordance with claim 27 wherein said alarms pertain directly to the safe operation of the transfer line subject to control by the method.

30. A method in accordance with claim 27 further comprising the step as of displaying to the human operator to view, in an animated fashion, the sequences of actuations and the interlock details and process details of any actuation while the operation defined by the actuation is executed automatically and in sequence.

31. A method in accordance with claim 30 wherein, in response to manual requests from the operator to view and to call for the execution of any actuation, displaying the actuation, and executing the process defined by the actuation, subject to interlock control.

32. A method in accordance with claim 30 wherein the operator calls for the random execution of any actuation subject to interlock control.

33. A method in accordance with claim 30 wherein said step for animating further comprises the step of displaying and revising any actuation in response to commands issued by a human operator having proper authorization to view and to edit said actuations.

34. A distributed computational system for a transfer line that comprises a plurality of machining workstations each having at least one machine for parts processing and at least one synchronizer workstation having at least one machine for parts transfer past all of the workstations, comprising:
a compact computational system at each workstation comprising input and output means for connecting the system to machines at the workstation, network means for connecting the system to the other computational systems, a data storage area containing sequences of machine actuations specific to the connected machines at that workstation, solver means and monitor means for defining the machining or parts transfer and monitoring operations to be carried out at that workstation, operator viewport means for permitting the operator to view, in an animated fashion, to execute manually (subject to interlock control), and to edit said actuations (if authorized to do so);
said operator viewport control means comprising a manual mode which permits an operator to view and select and call for the execution of any actuation, subject to interlock control;
said synchronizer computational system's data storage area containing actuations which generate all of the following commands, and broadcasts at least the first three of the following commands to the remaining workstations over said network means and awaits acknowledgment of completion of at least the first three of the following commands before proceeding:
part clamp; cycle units; part unclamp; engage transfer; advance transfer; disengage transfer; and return transfer.

35. A computational system for controlling a real-time process, comprising:
a programmable data processing system including means for processing data under program control, process input and output means for accepting process data from and transferring control data to said process, data storage means for storing data, and user viewport means for displaying data visually to a user and for accepting visual data editing commands and process operating commands from the user; said system including
edit means for enabling the user to use said user viewport means to create visual representations of actuations each defining a unique process monitoring and control operation, at least some of said actuations including at least one interlock displayed visually as a ladder logic interconnection of contacts defining a logical relationship of said process data that determines, along with other visual data, at least the onset, duration, or termination of a corresponding process control operation as well as a process monitoring function, and for enabling the user visually to link sequences of two or more actuations into at least one executable sequence, said edit means storing data representations of said actuations within said storage means, and
solver and monitor means for implementing the process control and monitoring operations defined by said data representations of said actuations, either automatically in sequence as determined by said linked executable sequences while simultaneously causing said viewport means to display to the user, in an animated fashion, the visual representation for each actuation while it is automatically executed, or manually, subject to interlock control, in response to operator manual selection of an individual actuation from visual representations of the actuations displayed to the user by said viewport means.

36. A computational system in accordance with claim 35 wherein said viewport means comprises means, when provided with a visual representation of an actuation by said solver and monitor, to indicate the state of process data corresponding to interlock ladder network contacts by means of visual attributes applied to the visual representations of the contacts such that the operator can determine the current state of process variables critical to any given actuation.

37. A computational system in accordance with claim 35 wherein said viewport means displays the actuations first as reduced size representations linked on the screen in executable sequence, with an enlarged visual representation of any actuation manually selected by the user or automatically being processed.

38. A computational system in accordance with claim 37 wherein the user viewport means comprises touch-screen means arranged to produce said enlarged visual representation in response to the user touching the corresponding reduced size representation.

39. A computational system in accordance with claim 38 wherein the user viewport means permits the user to touch a contact in an actuation ladder network and, in response to such a touch, displays data relevant to the corresponding system data.

40. A computational system in accordance with claim 35 wherein at least some of said visual representations of actuations include at least two interlock ladder networks of contacts, a first network determining the onset of a process control operation and a second network determining the termination of the process control operation.

41. A computational system in accordance with claim 40 wherein the visual information for an actuation also comprises a process operation timeout value, and wherein said means for monitoring comprises means to give forth an alarm indication if a timed operation exceeds said timeout value.

42. A computational system in accordance with claim 40 wherein said second ladder network, following termination of the process control function, defines ongoing monitoring of the maintenance of said termination condition.

43. A computational system in accordance with claim 42 wherein the visual information for an actuation also comprises a process operation timeout value, and wherein said means for monitoring comprises means to give forth an alarm indication if a timed operation exceeds said timeout value.

44. A computational system in accordance with claim 40 wherein at least some of said visual representations of actuations include at least a third interlock ladder network of contacts determining whether it is safe to continue a process control operation once initiated and prior to termination.

45. A computational system in accordance with claim 44 wherein the visual information for an actuation also comprises a process operation timeout value, and wherein said means for monitoring comprises means to give forth an alarm indication if a timed operation exceeds said timeout value.

46. A computational system in accordance with claim 44 wherein said second network, following termination of the process control function, defines ongoing monitoring of the maintenance of said termination condition.

47. A computational system in accordance with claim 46 wherein the visual information for an actuation also comprises a process operation timeout value, and wherein said means for monitoring comprises means to give forth an alarm indication if a timed operation exceeds said timeout value.

* * * * *